(12) United States Patent
Yoneda et al.

(10) Patent No.: US 9,719,621 B2
(45) Date of Patent: Aug. 1, 2017

(54) SNAP TAP FORMING METHOD AND SNAP TAP ATTACHING TOOL USED IN THE METHOD

(71) Applicant: Yone Corporation, Kyoto-shi, Kyoto (JP)

(72) Inventors: Toyohiko Yoneda, Kyoto (JP); Tetsuzo Yoneda, Kyoto (JP); Norio Doman, Kyoto (JP)

(73) Assignee: Yone Corporation, Kyoto (JP)

( * ) Notice: Subject to any disclaimer, the term of this patent is extended or adjusted under 35 U.S.C. 154(b) by 0 days.

(21) Appl. No.: 14/778,307

(22) PCT Filed: Mar. 24, 2014

(86) PCT No.: PCT/JP2014/058140
§ 371 (c)(1),
(2) Date: Sep. 18, 2015

(87) PCT Pub. No.: WO2014/148645
PCT Pub. Date: Sep. 25, 2014

(65) Prior Publication Data
US 2016/0281897 A1   Sep. 29, 2016

(30) Foreign Application Priority Data

Mar. 21, 2013 (JP) ................. 2013-058820
Mar. 21, 2013 (JP) ................. 2013-058821
Mar. 29, 2013 (JP) ................. 2013-072200

(51) Int. Cl.
*F16L 41/06* (2006.01)
*F16K 1/12* (2006.01)

(52) U.S. Cl.
CPC ............. *F16L 41/06* (2013.01); *F16K 1/12* (2013.01); *Y10T 137/612* (2015.04)

(58) Field of Classification Search
CPC ......... F16L 41/06; F16K 1/12; Y10T 137/612
See application file for complete search history.

(56) References Cited

U.S. PATENT DOCUMENTS 3,460,553 A   8/1969   Leopold, Jr. et al.
4,978,255 A   12/1990  Gale et al.
(Continued)

FOREIGN PATENT DOCUMENTS

CN   102149956 A   8/2011
EP   0304246 A1   2/1989
(Continued)

*Primary Examiner* — Kevin Lee
(74) *Attorney, Agent, or Firm* — Norris McLaughlin & Marcus, P.A.

(57) ABSTRACT

In a snap tap forming method, a partition wall formed along a curvature of a water pipe outer peripheral wall surface is brought into hermetical pressure contact with the water pipe outer peripheral wall and is mounted on the outer peripheral wall at a position corresponding to an inflow opening portion of a gate valve and at which a snap tap of the water pipe is formed. A center drill guide small hole aligned with the snap tap axis is drilled in a center portion of partition wall. A drilling machine inserted in a water flow sleeve of the gate valve is inserted into the aforementioned small hole. A water diverting port is formed in the partition wall and a peripheral wall of the water pipe using a core drill by advancing the drilling machine while estimating a drilling center. Then the drilling machine is removed from a water flow passage in the gate valve, and the snap tap is connected to the water diverting port by a snap tap attaching tool.

6 Claims, 36 Drawing Sheets

(56) References Cited

U.S. PATENT DOCUMENTS

| | | | |
|---|---|---|---|
| 6,274,073 B1 | 8/2001 | Schafstein | |
| 6,640,827 B1 * | 11/2003 | McClure | F16L 41/06 |
| | | | 137/318 |
| 8,402,992 B2 | 3/2013 | Yamashita | |
| 8,899,254 B1 * | 12/2014 | Weiler | F16L 55/1108 |
| | | | 137/15.08 |
| 2007/0284876 A1 | 12/2007 | Polivka et al. | |
| 2011/0103907 A1 | 5/2011 | Martin | |

FOREIGN PATENT DOCUMENTS

| | | |
|---|---|---|
| FR | 2678350 A1 | 12/1992 |
| JP | 9-100986 | 4/1997 |
| JP | 2625357 | 4/1997 |
| JP | 9-273186 | 10/1997 |
| JP | 09273186 A | 10/1997 |
| JP | 11-190457 | 7/1999 |
| JP | 2005-036862 | 2/2005 |
| JP | 2009-535578 | 10/2009 |
| WO | WO-2007/127447 | 11/2007 |

* cited by examiner

RELATED ART

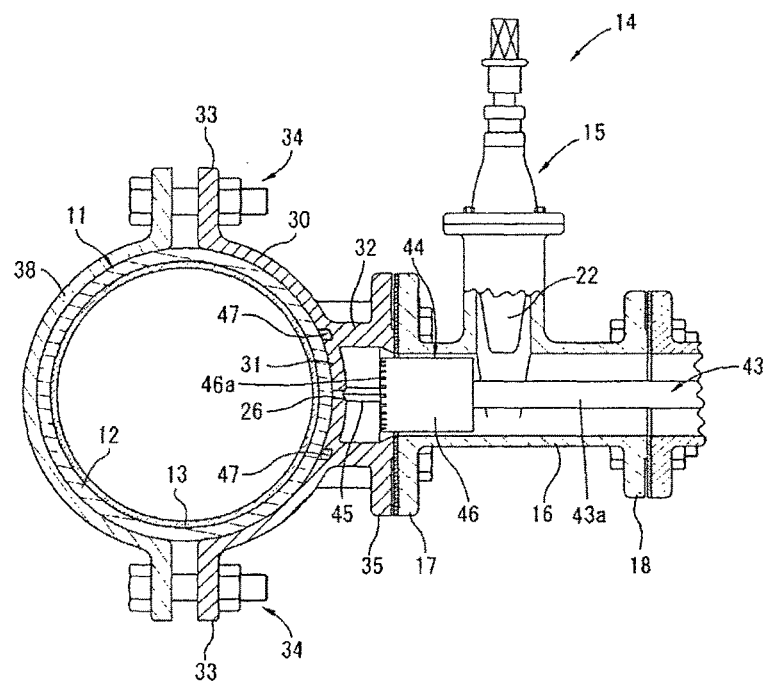

ENLARGED VIEW-1

ENLARGED VIEW-2

FIG. 35A
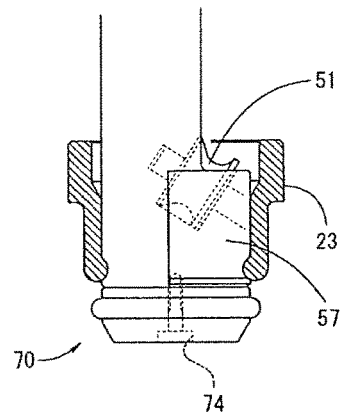
FIG. 35B
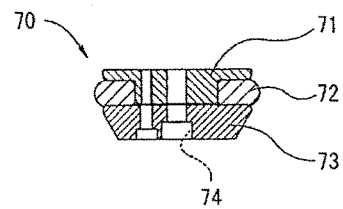
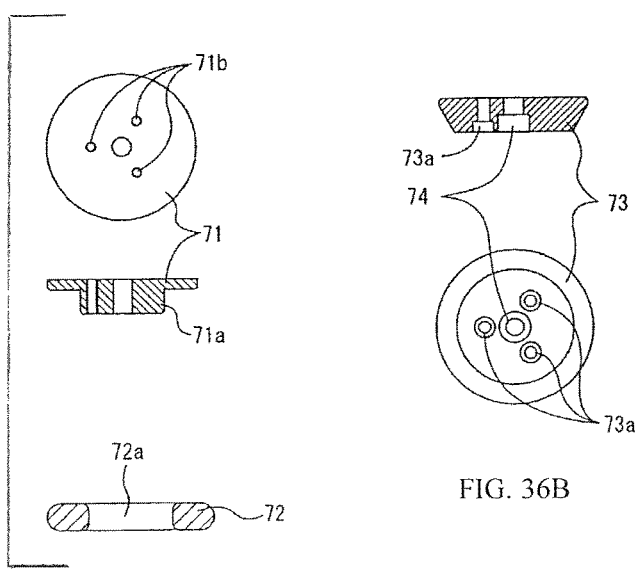
FIG. 36A
FIG. 36B

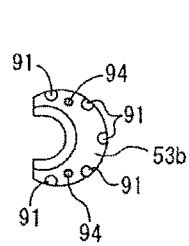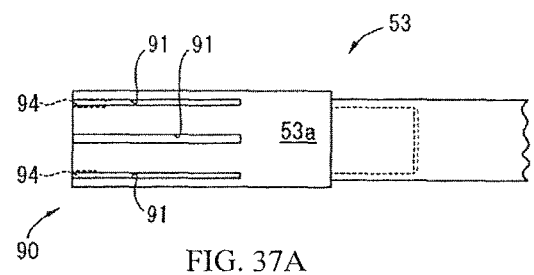
FIG. 37B  FIG. 37A
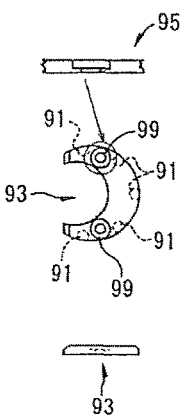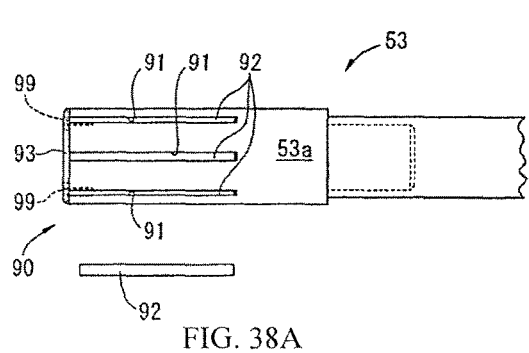
FIG. 38B  FIG. 38A
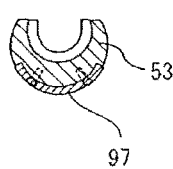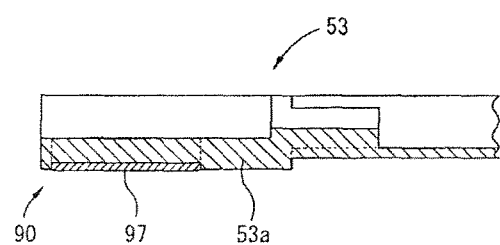
FIG. 39B  FIG. 39A FIG. 41A
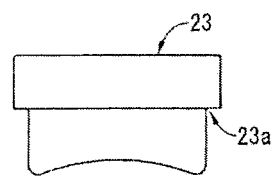
FIG. 41B
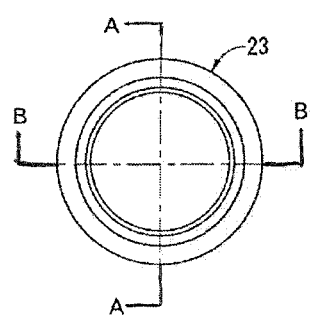
FIG. 41C        FIG. 41D
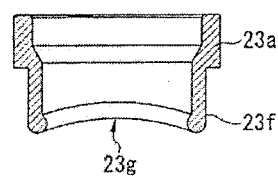   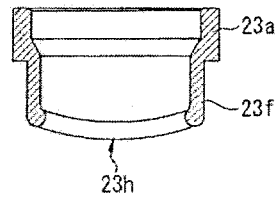

ELEVATION

LOWERING

CROSS SECTIONAL VIEW TAKEN ALONG LINE X1-X1

CROSS SECTIONAL VIEW TAKEN ALONG LINE X2-X2

CROSS SECTIONAL VIEW TAKEN ALONG LINE A-A

SNAP TAP FORMING METHOD AND SNAP TAP ATTACHING TOOL USED IN THE METHOD

BACKGROUND OF THE INVENTION

The present invention relates to a technique on a snap tap forming method where a gate valve is fixedly attached preliminarily to a peripheral wall of a water pipe having a duplex pipe structure where a regeneration pipe (repair pipe) is fitted into a deteriorated pipe, a water diverting port is formed by drilling the peripheral wall of the water pipe having a duplex pipe structure by a drill body of the drilling machine which is advanceable and retractable in the inside of a water flow sleeve of the gate valve, and the snap tap equipped with the gate valve is attached to the water diverting port of the water pipe, and a snap tap attaching tool used in the method.

Recently, water leakage troubles have frequently occurred along with the progress of deterioration of water pipe passages. Accordingly, it is necessary to dig out a deteriorated pipe which is an existing water pipe and to replace the deteriorated pipe with a new pipe. However, such an operation requires a large amount of time and a large amount of work cost. Accordingly, a regeneration pipe work method has been adopted where an inner surface of an existing pipe is cleaned, and a new pipe (a regeneration pipe) is fitted into and arranged in the inside of the existing pipe.

In a water pipe having the duplex pipe structure installed by such a regeneration pipe arranging method, there may be a case where it is necessary to perform a work for mounting a snap tap so as to divide water for leading water to other places.

In this case, there has been adopted a snap tap forming method of forming a snap tap equipped with a gate valve by fixedly attaching the gate valve to a peripheral wall of a water pipe and by forming a water diverting port by forming a hole in the peripheral wall of the water pipe having a duplex pipe structure by a drill body of a drilling machine which is advanceable and retractable in the inside of a water flow sleeve of the gate valve.

FIG. 10 is a cross-sectional view of the overall structure of a conventional regenerated water pipe 11 and a snap tap 14 mounted on the water pipe 11 for dividing water from the water pipe 11.

The water pipe 11 shown in FIG. 10 is constituted of: an existing pipe 12; and a regeneration pipe 13 fitted into the inside of the existing pipe 12 for regenerating the existing pipe 12.

The existing pipe 12 is a cylindrical water pipe installed from the beginning, and is a pipe whose deterioration has progressed with time.

The regeneration pipe 13 (NORDIPIPE) is constituted of a plurality of pipes fitted into the inside of the above-mentioned deteriorated existing pipe 12 with a predetermined length, and the deteriorated existing pipe 12 can be regenerated by arranging such a new regeneration pipe 13 in the inside of the existing pipe 12 by fitting.

In installing a branch flow pipe for dividing water from the water pipe 11 in which the regeneration pipe is fitted by branching, it is necessary to perform a work for mounting the snap tap on a predetermined portion of the water pipe.

In this case, a circular annular saddle which is an integral body preliminarily formed of a semi-annular band 38 and a saddle 30 is mounted on a portion of an outer periphery of the water pipe where the snap tap 14 is to be mounted in a surrounding manner.

As shown in FIG. 10, the saddle 30 includes: a saddle body 31 having a semi-annular cross section; and mounting flange portions 33 for band connecting which are formed on both ends of the saddle body 31. A mounting cylinder 32 to which the snap tap 14 is communicably connected is mounted on a center portion of the saddle body 31 in a projecting manner.

Symbol 34 indicates holts and nuts for integrally connecting both ends of the bands 38 having a semi-annular cross section to the mounting flange portion 33 of the saddle body 31. The circular annular saddle is formed by the saddle body 31 and the band 38.

The mounting cylinder 32 formed on the saddle 30 in a projecting manner is integrally fitted in an end portion of a water diverting port of the snap tap 14.

A gate valve 15 (soft seal gate valve) which is a valve device is mounted on the snap tap 14, and the gate valve 15 performs a valve opening or closing function for leading water divided from the existing pipe 12 and the regeneration pipe 13 to a predetermined place through a water diversion passage.

That is, the gate valve 15 is constituted of: a valve operating member (not shown in the drawing); a valve operating shaft 20; a valve casing 21; and a valve element 22. A middle portion of the water dividing passage can be opened or closed by advancing or retracting the valve element 22 in the vertical direction. Symbol 41 indicates a valve seat.

A rubber packing 23 is fitted on an outer periphery of a water diverting port 62 of the water pipe 11 on which the snap tap is mounted by insertion.

As shown in FIG. 10, a metal sleeve 40 is loosely fitted on an inner peripheral surface of the rubber packing 23, a peripheral end portion of the metal sleeve is bent in a peripheral edge direction by a snap tap attaching tool provided separately thus enlarging the peripheral edge portion of the metal sleeve in a trumpet shape in the inside of the regeneration, pipe 13 of the water pipe.

By mounting the rubber packing 23 and the metal sleeve 40 on the peripheral edge of the water diverting port 62, a water leakage from the water diverting port 62 can be prevented. Further, by interposing the metal sleeve 40 between the regeneration pipe 13 of the water pipe and the water flow sleeve 16 of the gate valve 15, a water guide passage leading to the snap tap from the water pipe 11 is formed.

For example, JP-T-2009-535578 discloses a snap tap forming method where a snap tap is formed by forming a water diverting port in a peripheral wall of a water pipe. That is, the snap tap forming method described in JP-T-2009-535578 is a snap tap forming method applicable to the case where a snap tap is newly mounted on a water pipe in which a regeneration pipe is disposed in the inside of an existing pipe. To be more specific, JP-T-2009-535578 discloses the method where a water diverting port is formed by integrally forming a hole in the regeneration pipe and the existing pipe by a drilling machine mounted on a gate valve, and the snap tap equipped with a gate valve is mounted on the water diverting port.

In mounting the snap tap, an opening portion formed at one end of a metal sleeve is made to project from the inside of the water diverting port of the water pipe, and a distal end portion of the opening of the metal sleeve which projects into the inside of the water pipe is bent by a diameter enlarging head mounted on a distal end of a main shaft of a jig inserted into the inside of the sleeve, a diameter enlarging roller mounted on the diameter enlarging head and the like in an inclined manner such that the distal end portion of the opening of the metal sleeve is folded back on an outer periphery of the metal sleeve, and the distal end portion of the opening of the metal sleeve is caulked to the water diverting port of the water pipe.

In this manner, to enable mounting of the snap tap while ensuring watertight connection between the water pipe and the mounting portion of the snap tap, there has been known the use of the snap tap attaching tool which is, as described above, constituted of: the diameter enlarging head mounted on the distal end of the main shaft; the diameter enlarging roller mounted on the diameter enlarging head and the like in an inclined manner.

With respect to the manner of operating the jig, as described in detail previously, the diameter enlarging roller mounted on the diameter enlarging head formed on the distal end of the main shaft in an inclined manner is brought into contact with the peripheral edge portion of the opening of the metal sleeve while manually adjusting the elevation or lowering of the main shaft and, subsequently, the peripheral edge portion of the opening of the metal sleeve is bent by the diameter enlarging roller arranged on the distal end of the main shaft such that the peripheral edge portion is folded back to the outside by rotating the main shaft (see JP-A-9-273186 and JP-A-11-190457).

SUMMARY OF THE INVENTION

In such a conventional snap tap forming method, it is necessary to perform a branching work under a condition where the supply of city water is not cut off. In such a branching work under a state where the supply of city water is not cut off, it is necessary that there is no leakage of water between the existing pipe and the regeneration pipe which form a duplex pipe.

However, in the above-mentioned patent literature 1, in forming a hole in a water pipe by inserting a drilling machine into a water flow passage in the inside of a body of a gate valve, there exists a drawback that a drill body of the drilling machine which is brought into contact with a hole forming portion of the regeneration pipe generates minute vibrations so that holes having the same diameter cannot be accurately formed in the existing pipe and the regeneration pipe respectively.

Further, clue to the vibrations of the drill body, there exists a drawback that a blade of a core drill is brought into contact with an outer peripheral wall surface of a saddle or the like so that rubbed portions or flaws are formed on a hole forming surface of a water diverting port or a portion around the hole forming surface. Further, there also exists a possibility that water leaks through such rubbed portions or flaws.

To overcome such drawbacks, there has been a demand for a technique by which holes having the same diameter can be formed in an existing pipe and a regeneration pipe with high accuracy by stationarily positioning and fixing the drill body thus bringing the drill body into a state where vibrations are not generated.

In JP-A-9-273186, in the jig used for caulking the sleeve after forming a hole, a unit for elevating or lowering the main shaft and a unit for rotating the main shaft are disposed at different positions and hence, a mounting device for mounting the snap tap per se becomes large-sized and hence, there exist drawbacks with respect to the conveyance of the device, mounting of the device on a water pipe, and operability of the device.

Further, in JP-A-9-273186, a shutter device is provided for removing the mounting device for the snap tap without leaking water after mounting the snap tap. Accordingly, the mounting device of the snap tap becomes large-sized or a weight of the mounting device is increased and hence, there exists a drawback that the conveyance of the mounting device of the snap tap and the mounting operation of the snap tap on a water pipe become difficult.

Further, a mechanism of sealing a communicating portion which is used in the snap tap mounting devices disclosed in JP-A-9-273186 and JP-A-11-190457 is operated in accordance with the above-mentioned technique of folding back the end portion of the metal sleeve. Although, this technique is a technique for forming the projecting end portion of the metal sleeve into a trumpet-shaped diameter enlarging surface along a round shape of the diameter enlarging roller using the diameter enlarging roller formed into an integral body having a Japanese hand drum shape, a circumferential length of the diameter enlarging roller with which the diameter enlarging surface is brought into contact differs among respective portions of the diameter enlarging surface. This difference in circumferential length becomes an obstacle in the diameter enlarging operation thus giving rise to a drawback that an extra force is necessary in a diameter enlarging force at the time of rotating the main shaft.

It is an object of the present invention to provide a snap tap forming method which can seal a communicating portion between a water pipe and a snap tap water-tightly while preventing a leakage of water between an existing pipe and a regeneration pipe which form a water pipe in a method of performing a branching work in a state where the supply of city water is not cut off.

It is another object of the present invention to provide, as a jig which can be used in an operation where a water diverting port is formed in an existing pipe and a regeneration pipe which form a water pipe, the water diverting port and a snap tap are communicably connected with each other water-tightly, and a sufficient sealing function can be achieved in the communicating portion, a snap tap attaching tool which is light-weight and small, can reduce an external force at the time of enlarging diameter, and has excellent operability.

(1) The present invention provides a snap tap forming method of forming a snap tap equipped with a gate valve by fixedly attaching the gate valve to a peripheral wall of a water pipe and by forming a hole in the peripheral wall of the water pipe by a drill body of a drilling machine which is advanceable and retractable in the inside of a water flow sleeve of the gate valve, wherein a partition wall which is formed along a curvature of an outer peripheral wall surface of the water pipe is hermetically brought into pressure contact with the outer peripheral wall of the water pipe and is mounted on the outer peripheral wall of the water pipe at a position which corresponds to an inflow opening portion of the gate valve and at which a snap tap of the water pipe is formed, and a center drill guide small hole which is aligned with an axis of the snap tap is formed in a center portion of the partition waif, and in forming the hole in the water pipe, a center drill of the drilling machine which is inserted into and accommodated in the inside of the water flow sleeve of the gate valve in an advanceable and retractable manner is inserted into the center drill guide small hole, and a water diverting port is formed in the partition wall and a peripheral wall of the water pipe using a core drill by advancing the drilling machine while estimating a drilling center and, thereafter, the drilling machine is removed from the inside of a water flow passage in the gate valve, and the snap tap is communicably connected to the water diverting port by a snap tap attaching tool provided separately.

(2) According to the present invention described in the above-mentioned (1), the partition wall is formed so as to close the inflow opening portion of the gate valve.

(3) According to the present invention described in the above-mentioned (1), the partition wall is formed on a center portion of a body of a saddle provided for mounting the gate valve on an outer periphery of the water pipe.

(4) According to the present invention described in the above-mentioned (2), a saddle for mounting the gate valve is mounted on a snap tap forming portion of the water pipe by way of a band which surrounds an outer periphery of the water pipe, a mounting cylinder which is fitted into the inflow opening portion of the gate valve is mounted on an outer peripheral wall of the saddle in a projecting manner, and a gate valve flange and a saddle flange are integrally connected with each other thus integrally connecting the gate valve and the saddle with each other.

(5) According to the present invention described in the above-mentioned (3), a saddle for mounting the gate valve is mounted on a snap tap forming portion of the water pipe by way of a band which surrounds an outer periphery of the water pipe, a mounting cylinder which is joined to the inflow water cylinder of the gate valve is mounted on an outer peripheral wall of the saddle in a projecting manner, and the gate valve and the saddle are integrally connected with each other using a gate valve flange and a saddle flange.

(6) The snap tap attaching tool described in the above-mentioned (1) of the present invention is characterized in that a rubber packing is fitted in the water diverting port formed in the water pipe by mounting the rubber packing on a distal end of the main shaft, an opening distal end portion of the metal sleeve loosely fitted on an inner peripheral surface of the rubber packing is configured to be insertable and projectable into the inside of the water pipe through the water diverting port, an eccentrically movable shaft is inserted into the main shaft in a longitudinal direction, a diameter enlarging roller is mounted on a lower end of the eccentrically movable shaft in an inclined manner by way of a diameter enlarging head, the diameter enlarging roller is of a Japanese hand drum shape and is constituted of a plurality of stacked roller pieces, the respective roller pieces are configured to be rotatable independently from each other, the diameter enlarging roller is configured to advance or retract toward the inside or the outside of an outer diameter of the main shaft due to eccentric rotation of the eccentrically movable shaft, and the snap tap is configured to be caulked to the water diverting port of the water pipe by bending the opening distal end portion of the metal sleeve toward an outer peripheral edge side in a folded-back state due to the rotation of the main shaft while bringing the diameter enlarging roller into contact with the opening distal end portion of the metal sleeve projecting into the inside of the water pipe in a state where the diameter enlarging roller is advanced to the outside of the outer diameter of the main shaft.

According to a first aspect of the invention, the partition wall which is formed along a curvature of the outer peripheral wall surface of the water pipe is hermetically brought into pressure contact with the outer peripheral wall of the water pipe and Is mounted on the outer peripheral wall of the water pipe at the position which corresponds to the inflow opening portion of the gate valve and at which the snap tap of the water pipe is formed, the center drill guide small hole which is aligned with the axis of the snap tap is formed in the center portion of the partition wall, and in forming the hole in the water pipe, the center drill of the drilling machine which is accommodated in the inside of the water flow sleeve of the gate valve in an advanceable and retractable manner is inserted into the center drill guide small hole, and the water diverting port is formed by drilling in the partition wall and the peripheral wall of the water pipe using a core drill by advancing the drilling machine while estimating the drilling center and, thereafter, the drilling machine is removed from the inside of the water flow sleeve of the gate valve, and the snap tap is communicably connected to the water diverting port by the snap tap attaching tool provided separately.

With such a configuration, the center drill guide small hole plays a role of a guide for guiding the center drill and hence, the drill body is guided at the center position of the partition wall along the center drill guide small hole without generating vibrations in the drill body.

Accordingly, it is possible to form the water diverting port having the same diameter in both the partition wall and the peripheral wall of the water pipe with high accuracy.

Further, by forming the water diverting port in both the partition wall and the peripheral wall of the water pipe simultaneously with the same diameter, neither rubbed portions and flaws are generated on the water diverting port so that flawless hole surfaces can be acquired whereby there is no possibility of leakage of water.

Thereafter, the drilling machine is removed from the inside of the water flow passage of the gate valve, the snap tap is communicably connected to the water diverting port by the snap tap attaching tool provided separately, and a rubber packing and a metal sleeve can be accurately and stably mounted on the water diverting port thus providing the snap tap having the water stoppage structure with no water leakage.

According to a second aspect of the invention, the partition wall is formed so as to close the inflow opening portion of the gate valve. Accordingly, it is possible to acquire an advantageous effect that the water diverting port can be accurately formed at the position of the inflow opening portion, of the gate valve by forming the hole in the partition wall.

According to a third aspect of the Invention, the partition wall is formed on the center portion of the body of the saddle provided for mounting the gate valve on the outer periphery of the water pipe. Accordingly, it is possible to acquire an advantageous effect that the water diverting port can be accurately formed on the center portion of the body of the saddle by forming the hole in the partition wall.

According to a fourth aspect of the invention, the saddle for mounting the gate valve is mounted on the snap tap forming portion of the water pipe by way of the band which surrounds the outer periphery of the water pipe, the mounting cylinder which is fitted into the inflow opening portion of the gate valve is mounted on the outer peripheral surface of the saddle in a projecting manner, and the snap tap formed of the gate valve is integrally connected to the mounting cylinder of the saddle by way of the gate valve flange and the saddle flange. Accordingly, it is possible to guide water to the snap tap from the water pipe without causing leakage of water.

According to a fifth aspect of the invention, the saddle for mounting the gate valve is mounted on the snap tap forming portion of the water pipe by way of the band which surrounds the outer periphery of the water pipe, the mounting cylinder which is joined to the water flow sleeve of the gate valve is mounted on the outer peripheral surface of the saddle in a projecting manner, and the gate valve and the saddle are integrally connected with each other by the gate valve flange and the saddle flange. Accordingly, it is possible to guide water to the snap tap from the water pipe without causing leakage of water.

According to a sixth aspect of the invention, the snap tap attaching tool for use in the method of the first aspect of the invention is characterized in that the rubber packing configured to be fitted in the water diverting port formed in the water pipe by mounting the rubber packing on the distal end of the main shaft, the opening peripheral edge portion of the metal sleeve loosely fitted on the inner peripheral surface of the rubber packing is configured to be insertable and projectable into the inside of the water pipe, the eccentrically movable shaft is configured to be inserted into the cylindrical sleeve pushing pipe which constitutes the main shaft in a longitudinal direction, the diameter enlarging head having a larger diameter than a movable shaft has is mounted on a lower end of the eccentrically movable shaft, the diameter enlarging roller is formed on a portion of the diameter enlarging head in an inclined manner, the diameter enlarging roller of Japanese hand drum shape constituted of a plurality of roller pieces as described above, the respective roller pieces are configured to be rotatable independently from each other, the diameter enlarging roller is configured to advance or retract toward the inside or the outside of the outer diameter of the main shaft due to the eccentric rotation of the eccentrically movable shaft, and the snap tap is configured to be caulked to the water diverting port of the water pipe by bending the opening distal end portion of the metal sleeve toward the outer peripheral edge side in a folded-back state due to the rotation of the main shaft while bringing the diameter enlarging roller into contact with the opening distal end portion of the metal sleeve projecting into the inside of the water pipe in a state where the diameter enlarging roller is advanced to the outside of the outer diameter of the main shaft. By "Japanese hand drum shape" is meant having a symmetrical circumferential surface generated by rotation of a symmetrical concave curve about an axis, the concavity of the curve facing away from the axis. Further, because the diameter enlarging roller is of a Japanese hand drum shape and constituted of a plurality of roller pieces as described above, and the respective roller pieces are configured to be rotatable independently from each other, even when the circumferential length of the diameter enlarging roller differs depending on the round shape of the diameter enlarging roller, it is possible to prevent the occurrence of a drawback that the diameter enlarging force is decreased at the time of forming the diameter enlarging surface. Further, although the main shaft is rotated so as to fold back the opening peripheral edge portion of the metal sleeve toward the outer peripheral edge side, it is unnecessary to provide an extra force to a diameter enlarging force which is necessary for such an operation.

BRIEF DESCRIPTION OF THE DRAWINGS

FIG. 4A to FIG. 4C are explanatory views showing the structure of a saddle according to the embodiment 1, wherein FIG. 4A is a side view showing the structure of the saddle, FIG. 4B is a plan view showing the structure of the saddle, and FIG. 4C is a cross-sectional view showing the structure of the saddle having a tapered surface.

FIG. 14A to FIG. 14D are explanatory views showing the structure of a saddle according to the embodiment 2, wherein FIG. 14A is a side view showing the structure of the saddle, FIG. 14B is a plan view showing the structure of the saddle, FIG. 14C is a cross-sectional view showing the structure of the saddle having a tapered surface, and FIG. 14D is a cross-sectional view showing the structure of a saddle having no tapered surface.

FIG. 17 is an explanatory view for explaining a state where a drilling machine is mounted on the gate valve according to the embodiment 2.

FIG. 18 is an explanatory view for explaining a state where a hole is formed in the water pipe by drilling using the drilling machine according to the embodiment 2.

FIGS. 35A and 35B show a state where a guide member is mounted on the diameter enlarging head.

FIGS. 36A and 36B are views for explaining the constitution of the guide member, FIG. 36B being an exploded view.

FIGS. 37A and 37B are views for explaining a seizure preventing member mounted on an outer peripheral surface of an eccentrically movable bearing.

FIGS. 38A and 38B are views for explaining the seizure preventing member mounted on the outer peripheral surface of the eccentrically movable bearing.

FIGS. 39A and 39B are views for explaining the seizure preventing member mounted on the outer peripheral surface of the eccentrically movable bearing.

FIG. 41A-FIG. 41D are views showing the constitution of a modification of the rubber packing.

DETAILED DESCRIPTION OF THE INVENTION

The present invention relates to, in a branching work performed without cutting off the water supply, a technique for forming a water diverting port in an outer peripheral wall of the water pipe by drilling and for communicably connecting a gate valve to the water diverting port.

That is, the present invention is directed to a technique where a regeneration pipe is fitted on a deteriorated existing pipe thus forming a water pipe having a duplex pipe structure, a gate valve is fixedly attached to a peripheral wall of the water pipe in a communicable state, a water diverting port is formed by drilling the peripheral wall of the water pipe having a duplex pipe structure using a drill body of a drilling machine which advances and retracts in the inside of a water flow sleeve of the gate valve, and a snap tap constituted of the gate valve is communicably connected to the water diverting port.

Further, the present invention is directed to a technique where an Inflow opening portion of the gate valve is closed by a partition wall which is formed along a curvature of an outer peripheral wall surface of the water pipe, or a proximal portion of a mounting cylinder at the center portion of a saddle is closed by the partition wall which is formed along the curvature of the outer peripheral wall surface of the water pipe, and the center drill guide small hole is formed in the center of the partition wall such that the center drill guide small hole corresponds to the position to be the center of the snap tap in the water pipe. Further, the present invention is directed to a technique where a core drill guide hole having the same diameter as a core drill of the drilling machine is formed by drilling.

Hereinafter, the detailed description is made with respect to the formation of the snap tap according to the present invention.

[Structure of Snap Tap of the Present Invention]

Figure 1:
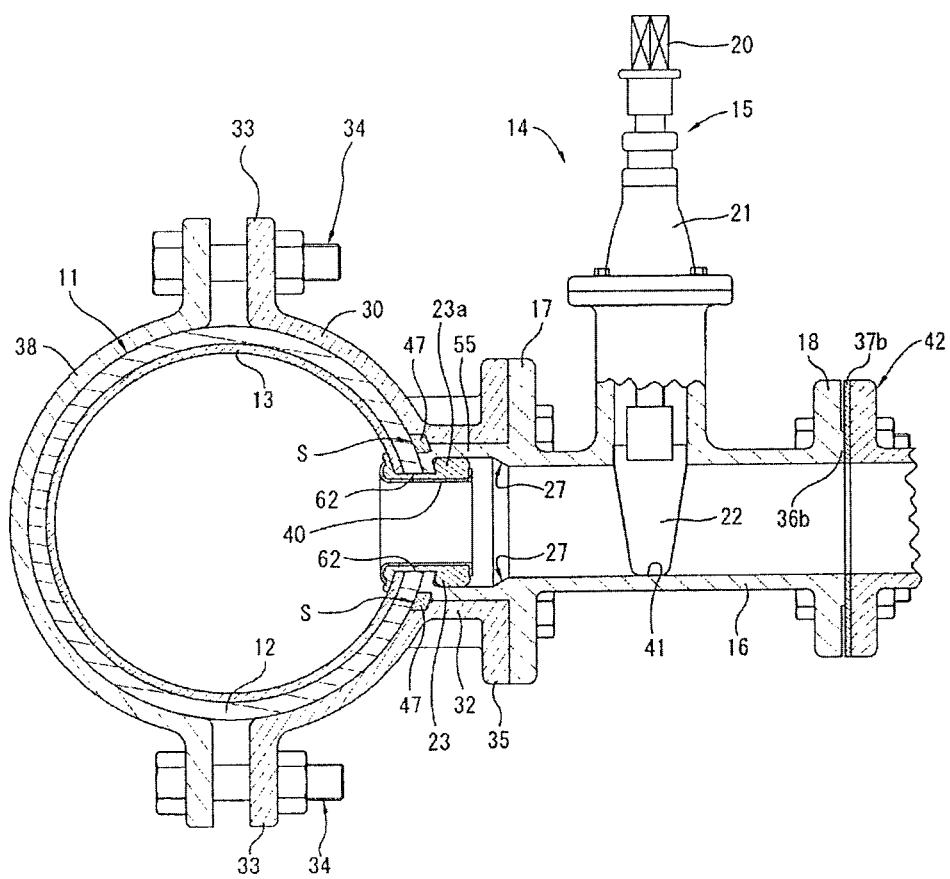
FIG. 1 is a cross-sectional view showing the whole structure of a water pipe and a snap tap according to an embodiment 1.

FIG. 1 is a cross-sectional view showing the whole structure of a water pipe 11 and a snap tap 14 according to the present invention.

According to the present invention, as shown in FIG. 1, a gate valve 15 is fixedly attached to a peripheral wall of the water pipe 11 by way of a saddle 30, a hole is formed on a peripheral wall of an existing pipe 12 which constitutes the water pipe 11 and a peripheral wall of a regeneration pipe 13 which also constitutes the water pipe 11 and is fitted in the existing pipe 12 respectively using a drill body 44 (shown in FIG. 7) of a drilling machine 43 (shown in FIG. 7) which advances and retracts in the inside of a water flow sleeve 16 of the gate valve 15, and the gate valve 15 is communicably connected to the water diverting port formed by drilling thus forming the snap tap 14.

[Structure of Gate Valve]

Figure 2:
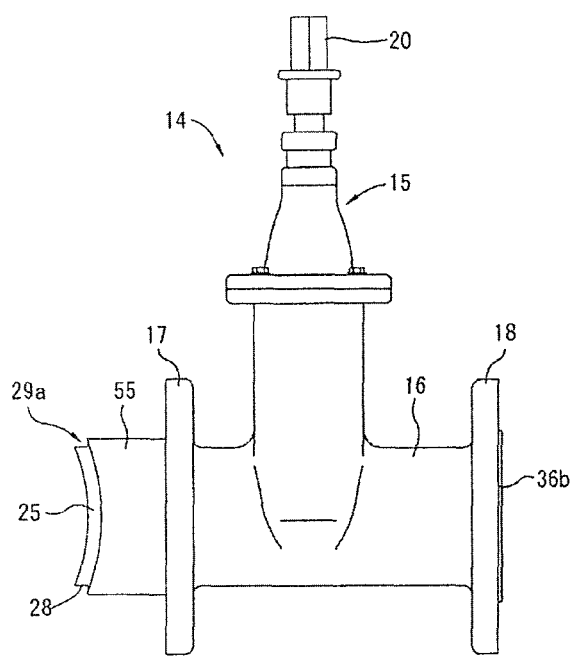
FIG. 2 is an explanatory view showing the whole structure of the snap tap equipped with a gate valve according to the embodiment 1.

FIG. 2 is an explanatory view showing the whole structure of the snap tap 14 equipped with the gate valve 15.

Figure 3:
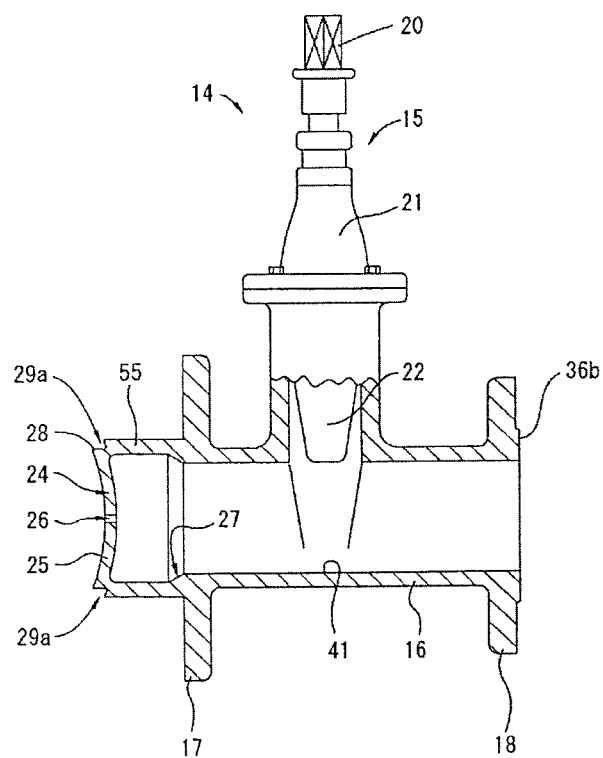
FIG. 3 is an explanatory view showing the cross-sectional structure of the snap tap equipped with the gate valve according to the embodiment 1.

FIG. 3 is an explanatory view showing the cross-sectional structure of the snap tap 14 equipped with the gate valve 15.

Firstly, the structure of the snap tap 14 is explained. As shown in FIG. 2 and FIG. 3, the snap tap 14 is constituted of: the water flow sleeve 16 which defines a portion of a water flow sleeve passage, and the gate valve 15 which is interposed in the middle of the water flow sleeve 16 for releasing or stopping water in the water flow sleeve passage.

As shown in FIG. 3, the gate valve 15 is constituted of: a valve element 22 which is displaceable between a closing position where the valve element 22 closes the water flow passage in the water flow sleeve 16 and an opening position where the valve element 22 opens the inside of the water flow sleeve 16; a valve operating shaft 20 which is arranged on an upper portion of the valve element 22 so as to control the displacement of the valve element 22; and a valve box 21 provided for incorporating the valve operating shaft 20 therein in a rotatable manner.

Further, the valve operating shaft 20 has an upper end portion thereof projected from the valve box 21, and a valve operating member (not shown in the drawing) can be mounted on the projecting upper end portion.

As the gate valve 15, a soft seal valve is adopted, for example. The soft seal valve is a valve which can enhance a water stopping performance compared to a normal gate valve 15 by mounting a rubber-made sealing material on the valve element 22.

In this embodiment, although the description is made with respect to the snap tap 14 equipped with the gate valve 15 formed of a soft seal valve, a method of forming the snap tap 14 of the present invention is also applicable to the snap tap 14 equipped with a normal gate valve 15.

As shown in FIG. 2 and FIG. 3, the water flow sleeve 16 has a pair of flanges on both ends thereof respectively.

That is, a first flange 17 is formed on one end of the water flow sleeve 16, and a second flange 18 is formed on the other end of the water flow sleeve 16.

The first flange 17 is joined to a saddle flange 35 (shown in FIG. 4) on a saddle 30 side thus communicably connecting the water flow sleeve 16 and the saddle 30 to each other.

The second flange 18 is a flange for mounting the drilling machine 43 and the snap tap attaching tool 10 at the time of forming the snap tap 14, and is used as a flange for communicably connecting another branch pipe 42 after the snap tap 14 is mounted on the saddle 30.

The second flange 18 has a circular cylindrical flange portion 36b which projects outward on a joint surface thereof joined to a flange of another pipe. The sealing performance can be held by interposing the circular cylindrical flange portion 36b and the rubber-made packing 37b (shown in FIG. 1) between the second flange 18 and the flange of another pipe.

[Structure of Saddle]

Next, the structure of the saddle 30 is explained in detail.

Figure 4A:
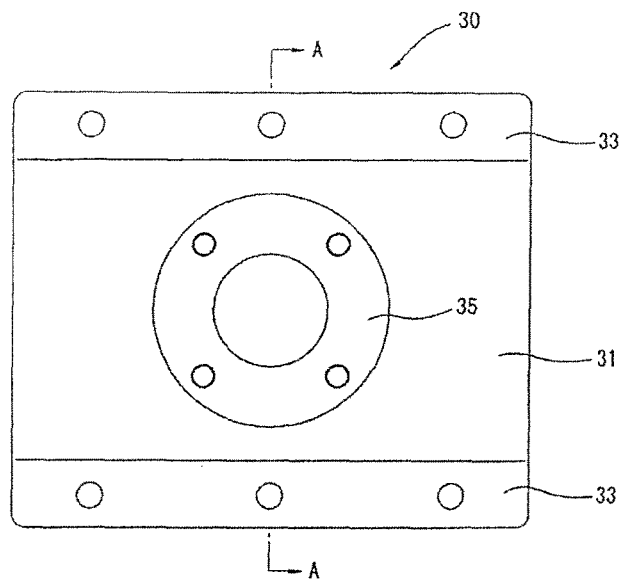
Figure 4B:
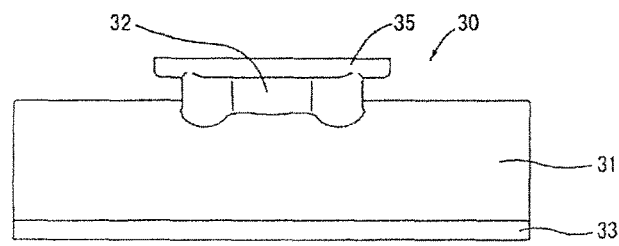
Figure 4C:
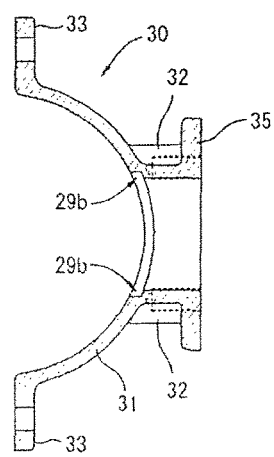

FIG. 4A is a side view showing the structure of the saddle 30, FIG. 4B is a plan view showing the structure of the saddle 30, and FIG. 4C is a cross-sectional view showing the structure of the saddle 30.

As shown in FIG. 4A to FIG. 4C, the saddle 30 has a rectangular shape as viewed in a side view and is formed into an approximately arc shape in a lateral cross section. The saddle 30 is constituted of: a semicircular saddle body 31 for connecting the snap tap to the water pipe 11, mounting flange portions 33 which are disposed on both ends of the saddle body 31 respectively; a cylindrical mounting cylinder 32 which projects toward the outer periphery from the center of the saddle body 31; and a saddle flange 35 which is formed on a distal end of the mounting cylinder 32.

That is, as shown in FIG. 4A to FIG. 4C, the semicircular saddle 30 forms a semicircular annular saddle forming body by being integrally combined with a semicircular band 38 which is mounted on a peripheral surface of the water pipe 11 in a close contact manner, and surrounds the outer periphery of the water pipe 11 at a position where the snap tap 14 is formed.

The mounting cylinder 32 of the saddle 30 and a projecting cylinder 55 formed on the snap tap 14 are communicated with each other by way of the joint between the saddle flange 35 and the first flange 17. In this manner, the water pipe 11 and the snap tap 14 are communicably connected to each other by way of the saddle 30.

Embodiment 1

[Structure of Partition Wall of Gate Valve]

In this embodiment, the inflow opening portion 24 of the gate valve 15 is closed by a partition wall 25 which is formed along a curvature of an outer peripheral wall surface of the water pipe 11.

That is, the projecting cylinder 55 is mounted on the water flow sleeve 16 of the gate valve 15 in an extending manner and, as shown in FIG. 2 and FIG. 3, the projecting cylinder 55 is fitted in the mounting cylinder 32 of the saddle 30 as described later.

The projecting cylinder 55 constitutes a water guide passage for guiding water flowing in the water pipe 11 to the snap tap 14 in a branching manner.

A tapered inner diameter surface 27 is formed on the projecting cylinder 55, and the tapered inner diameter surface 27 has an inner diameter larger than an inner diameter of the water flow sleeve 16.

As shown in FIG. 3, the tapered inner diameter surface 27 is formed on a first flange 17 side.

With such a configuration, it is possible to prevent the generation of a turbulence flow which may be generated when there is a difference in inner diameter between the projecting cylinder 55 and the water flow sleeve 16 of the gate valve 15. Accordingly, water from, the water pipe 11 can be smoothly guided to or introduced into the water dividing pipe.

In this embodiment, an inner surface of the projecting cylinder 55 is formed into a tapered shape. However, a method of forming the snap tap 14 of the present invention is also applicable to the projecting cylinder 55 having no tapered shape on an inner surface thereof.

The partition wall 25 is formed on an end portion of the projecting cylinder 55 on a saddle 30 side.

As shown in FIG. 3, the partition wall 25 is formed with a curve having a curvature such that the partition wall 25 can close a water diverting port 62 along a curvature of the outer peripheral wall surface of the water pipe 11.

Accordingly, as shown in FIG. 3, the end portion of the projecting cylinder 55 can be brought into contact with a peripheral edge of the water diverting port 62 along a surface of the water pipe 11.

Further, by forming the hole in the partition wall 25 by drilling using the drilling machine 43, the inflow opening portion 24 is formed in the partition wall 25. The inflow opening portion 24 is formed by drilling the partition wall 25 simultaneously with the drilling of the peripheral wall of the water pipe 11 thus forming the water diverting port 62.

The water pipe 11 and the gate valve 15 are integrally and communicably connected to each other through the water diverting port 62.

A rubber packing 23 and a metal sleeve 40 which perform a sealing function are provided to the water diverting port 62.

[Detail Constitution of Center Drill Guide Small Hole]

A center drill guide small hole 26 is formed in the center of the partition wall 25 which corresponds to a center position of the snap tap 14 of the water pipe 11 by drilling.

That is, as shown in FIG. 3, the center drill guide small hole 26 is formed in the partition wall 25 having the same curvature as the outer peripheral wall of the water pipe 11 at the center position of the partition wall 25 by drilling, and the center drill guide small hole 26 has a gate valve 15 side thereof formed into a tapered shape, and has a saddle 30 side thereof formed into a straight shape.

Further, the center drill guide small hole 26 has a diameter smaller than a diameter of a body of the center drill 45.

The small hole 26 functions as a guide for the center drill 45 at the time of forming a hole by drilling using the center drill 45.

The drilling machine 43 used in a drilling step of the present invention is explained with reference to FIG. 7 and FIG. 8.

The drilling machine 43 includes a core drill 46 and a center drill 45 formed on a distal end side of a proximal-end-side drill shaft.

Figure 7:
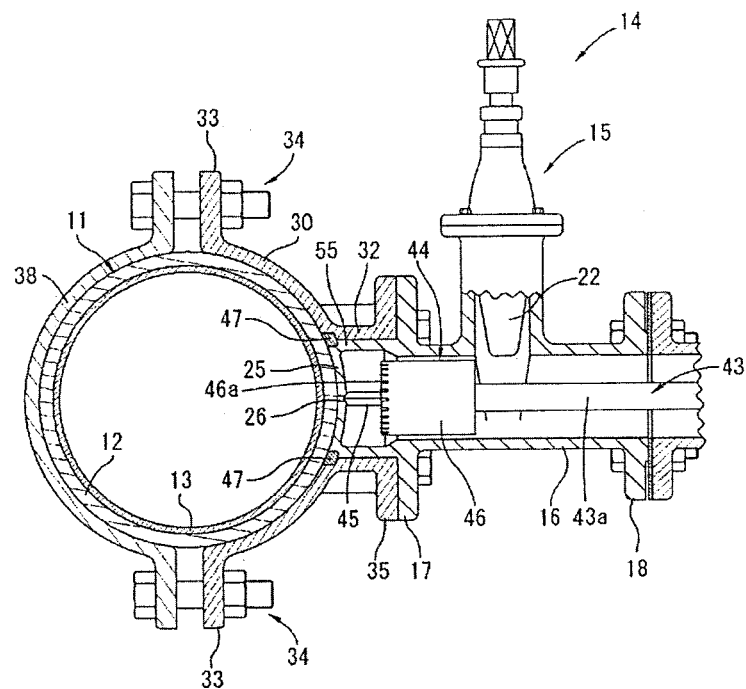
FIG. 7 is an explanatory view for explaining a state where a drilling machine is mounted on the gate valve according to the embodiment 1.
Figure 8:
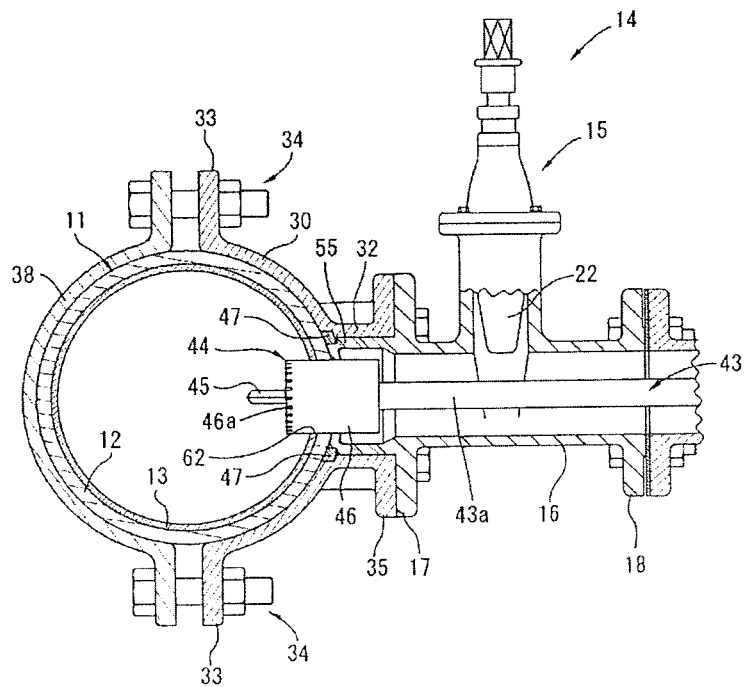
FIG. 8 is an explanatory view for explaining a state where a hole is formed in a water pipe by drilling using the drilling machine according to the embodiment 1.

As shown in FIG. 7 and FIG. 8, the core drill 46 is formed into a circular cylindrical shape with a distal end open for forming a large diameter hole in the water pipe 11 by drilling, and drill blades 46a are mounted on a distal end portion of the core drill 46.

The center drill 45 is provided for forming the center drill guide small hole 26 by drilling before the core drill 46 forms the hole, is mounted on a distal end of a center shaft of the core drill 46 in a projecting manner, and is formed into an elongated rod shape having a sharpened tip. The distal end portion of the center drill 45 projects more frontward than the drill blades 46a formed on a peripheral edge of the core drill 46 do.

In this embodiment, although the center drill guide small hole 26 is formed of a through hole, the center drill guide small hole 26 may be formed of a hole other than the through hole. The shape of the hole may be also a triangular shape in cross section, for example. The shape of the through hole or the shape of the hole is not particularly limited.

The center drill guide small hole 26 which is formed in the partition wall 25 at the center position of the partition wall 25 by drilling using the center drill 45 can be used for a water pressure test on the gate valve 15 used in the snap tap. That is, after the valve element 22 is closed, water is filled into the gate valve 15 from the small hole so as to increase a water pressure, and the presence or the non-presence of a leakage of water from the gate valve 15 is checked.

As described above, by forming the center drill guide small hole 26 in the partition wall 25, the small hole 26 functions as a guide for the center drill 45, and the hole can be formed in the partition wall 25 at the center position of the partition wall 25 accurately by drilling using the center drill 45.

That is, by forming the center drill guide small hole 26, wobbling does not occur in the drill body 44 of the drilling machine 43 and hence, the hole can be accurately formed in the partition wall 25 at the center position of the snap tap 14 by drilling and, at the same time, the hole can be accurately formed also in the existing pipe 12 and the regeneration pipe 13 thus accurately forming the water diverting port 62 in the peripheral surface of the water pipe 11.

As described above, since the hole can be accurately formed, there is no generation of rubbed portions and flaws on the water diverting port 62 thus eliminating a possibility that water leaks from a damaged portion of the water diverting port.

[Detail Constitution of Core Drill Guide Hole According to Another Embodiment]

In this embodiment, the core drill guide hole 64 having the same diameter as the core drill 46 is preliminarily formed in the partition wall 25, and the core drill 46 is positioned by the guide hole and hence, the water diverting port 62 can be formed accurately by forming a hole in the existing pipe 12 and the regeneration pipe 13 simultaneously while making use of the core drill guide hole 64.

Figure 9:
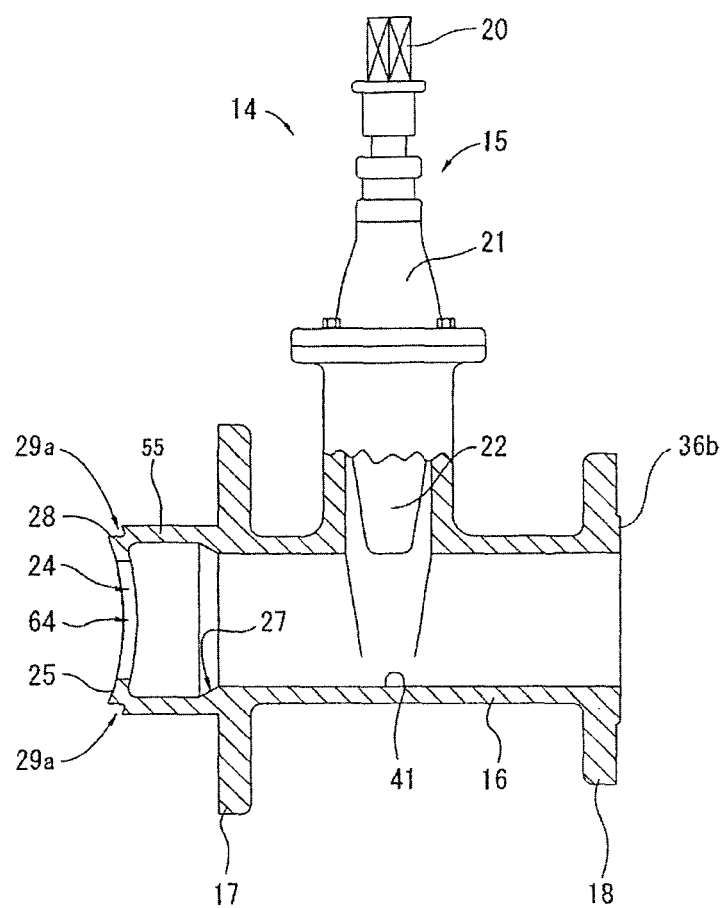
FIG. 9 is a cross-sectional view showing the cross-sectional structure of the gate valve having a core drill guide hole according to the embodiment 1.
Figure 10:
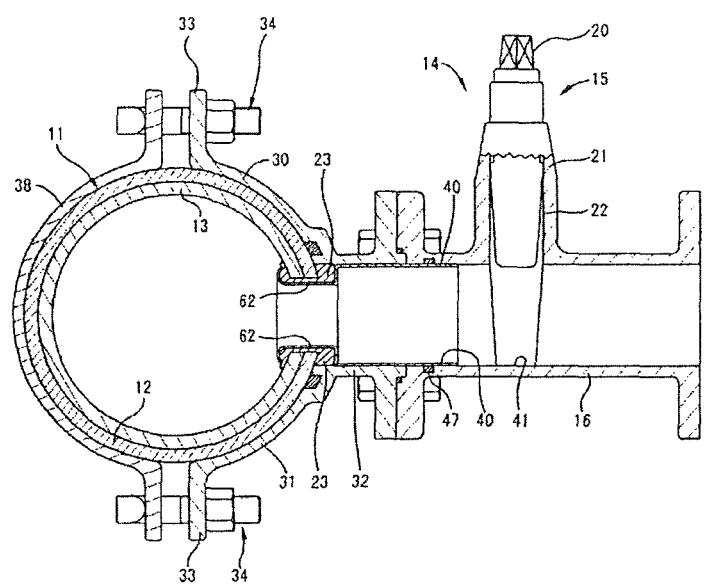
FIG. 10 is a cross-sectional view showing the whole structure of a conventional water pipe and a conventional snap tap.

FIG. 9 is an explanatory view of the gate valve where the core drill guide hole 64 is preliminarily formed in the partition wall 25.

That is, as shown in FIG. 9, this embodiment is characterized in that the core drill guide hole 64 is directly formed in the partition wall 25 in place of the center drill guide small hole 26 in the embodiment 1.

As shown in FIG. 9, before a hole is formed by drilling using the drilling machine 43, the core drill guide hole 64 having the approximately same diameter as the core drill 46 is formed in the partition wall 25.

That is, the positioning core drill guide hole 64 having the same diameter as the core drill 46 is formed in the partition wall 25 in a state where the center of the partition wall 25 having the same curvature as the existing pipe 12 is aligned with the center position of the core drill 46.

In this embodiment, the structures other than the structure of the core drill guide hole 64 are equal to the corresponding structures in the embodiment 1.

In forming the hole in the partition wall 25 by drilling using the drilling machine 43, since the core drill 46 has the same diameter as the hole formed in the partition wall 25, the core drill 46 advances along the core drill guide hole 64 so that the hole having the same diameter as the core drill guide hole 64 can be formed in the existing pipe 12 and the regeneration pipe 13. Accordingly, the hole can be accurately formed in the existing pipe 12 and the regeneration pipe 13. In this case, in this embodiment, the steps other than the drilling step are equal to the corresponding steps in the embodiment 1.

Also in this case, due to the formation of the core drill guide hole 64 which functions as a guide for the core drill 46, there is no possibility that fine vibrations are generated in the drill body 44 and hence, it is possible to form the water diverting port in the partition wall 25 at a position which corresponds to the center position of the snap tap 14, the saddle body 31, and the water pipe 11 accurately and simultaneously by drilling.

[Structure of Seal Ring]

Further, as shown in FIG. 2 and FIG. 3, a projecting flange portion 28 having a diameter smaller than an outer diameter of the projecting cylinder 55 is formed on an end portion of the projecting cylinder 55 (a saddle 30 side) of the gate valve 15.

The projecting flange portion 28 is formed of a mounting step 29a and hence, an outer diameter of the partition wall 25 which closes the opening end portion of the projecting cylinder 55 is decreased.

Accordingly, when the mounting cylinder 32 and the projecting cylinder 55 are engaged with each other by fitting engagement and are communicably connected to each other, by bringing the mounting step 29a of the partition wall 25 having a narrowed diameter and a mounting step 29b formed on a proximal portion of the mounting cylinder 32 mounted on the saddle 30 in a projecting manner into contact with each other with a seal member 47 interposed therebetween, a complete sealing function can be acquired between the mounting cylinder 32 and the projecting cylinder 55.

In this embodiment, also on a saddle 30 side, as shown in FIG. 4, the mounting step 29b is formed on the proximal-end-side periphery of the mounting cylinder 32 of the saddle 30.

As described above, in mounting the gate valve 15 on the saddle 30, by combining the mounting step 29a on a gate valve 15 side and the mounting step 29b on a saddle 30 side to each other with the seal member 47 interposed between the mounting step 29a and the mounting step 29b, an annular seal mechanism is formed.

[Detail Description of Drilling Method]

Next, the drilling method (hole forming method) according to the present invention is explained in detail.

The drilling method is explained specifically after a saddle mounting step and a gate valve mounting step are explained.

Firstly, the saddle mounting step is explained.

Figure 5:
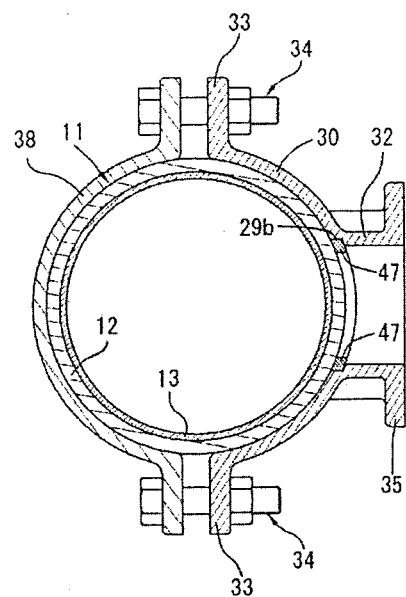
FIG. 5 is an explanatory view for explaining a state where the saddle is mounted on the water pipe according to the embodiment 1.

FIG. 5 is an explanatory view for explaining a state where the saddle 30 is mounted on the water pipe 11.

Firstly, as shown in FIG. 5, the band 38 is mounted on the peripheral wall of the water pipe 11, the saddle 30 is integrally mounted on the band 38, and the band 38 and the saddle 30 are fixedly fastened to each other using bolts and nuts 34 by way of flanges. Due to such a configuration, the saddle 30 and the band 38 are formed as an integral body, and are mounted on the water pipe 11 so as to surround the outer periphery of the water pipe 11.

Next, the gate valve mounting step is explained.

Figure 6:
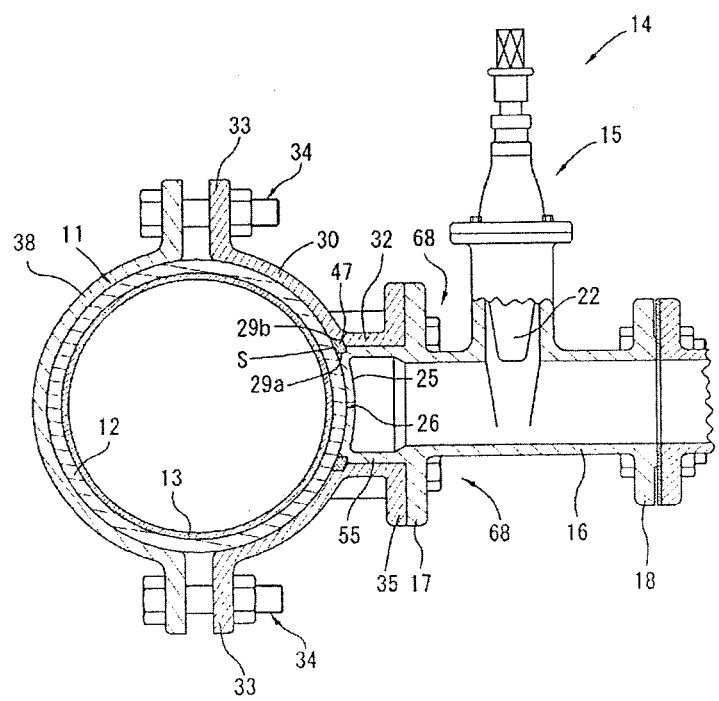
FIG. 6 is an explanatory view for explaining a state where the gate valve is assembled to the saddle according to the embodiment 1.

As shown in FIG. 6, the saddle flange 35 on a saddle 30 side and the first flange 17 on a snap tap 14 side are joined to each other and are fixedly fastened to each other using a attaching tool 68 so that the gate valve 15 is mounted on the saddle 30.

The projecting cylinder 55 of the gate valve 15 projects toward the saddle 30 side from the first flange 17. The projecting cylinder 55 is fitted in the mounting cylinder 32 of the saddle 30.

Further, the partition wall 25 formed on an end portion of the projecting cylinder 55 has the same curvature as the existing pipe 12 and the like and hence, in a state where the projecting cylinder 55 is fitted in the mounting cylinder 32 of the saddle 30, the partition wall 25 of the projecting cylinder 55 is brought into contact with the water pipe 11 along the outer peripheral portion of the water pipe 11.

As shown in FIG. 6, when the gate valve 15 is integrally connected to the saddle 30, the mounting step 29a on a saddle 30 side and the mounting step 29b on a gate valve 15 side are brought into contact with each other with the seal member 47 interposed therebetween.

Due to this seal ring mechanism, the stopping of water can be performed between the gate valve 15 and the saddle 30, and the stopping of water can be performed also between the saddle 30 and the existing pipe 12.

Further, due to the fitting engagement between the mounting cylinder 32 and the projecting cylinder 55 and the sealing mechanism, the stopping of water can be performed even during the branching work under a condition that the cutting-off of the water supply is not performed, and after the branching work, such a structure has a function of preventing the intrusion of water, soil and sand or the like from the outside.

Next, the drilling step is explained.

FIG. 7 is an explanatory view for explaining a state where the drilling machine 43 is mounted on the gate valve 15.

The drilling machine 43 is mounted on one side of the water flow sleeve 16 of the gate valve 15. The drilling machine 43 is equipped with the core drill 46 and the center drill 45 on a distal end side of a proximal-end-side drill shaft.

In using the drilling machine 43, the gate valve 15 is opened and, thereafter, the center drill 45 and the core drill 46 are advanced into the water flow sleeve 16 from one side of the water flow sleeve 16.

Then, the drill body 44 is advanced until the distal end of the center drill 45 is brought into contact with the center drill guide small hole 26.

Then, in a state where the valve element 22 of the gate valve 15 is opened, the drilling machine 43 is driven so that a hole is formed in the existing pipe 12 and the regeneration pipe 13 by drilling.

That is, as shown in FIG. 7, the center drill 45 is inserted into the center drill guide small hole 26. The small hole 26 functions as a guide for advancing the core drill 46. When the core drill 46 is advanced straightly, the water diverting port 62 is formed in the partition wall 25 and the peripheral wall of the water pipe 11 by drilling simultaneously.

That is, as shown in FIG. 8, by advancing the drilling machine 43 while estimating the center of drilling by the center drill guide small hole 26, the hole can be formed in the partition wall 25, the regeneration pipe 13 and the existing pipe 12 by drilling simultaneously using the core drill 46.

Accordingly, the water diverting port 62 can be accurately formed in the partition wall 25, the existing pipe 12 and the regeneration pipe 13 simultaneously in a state where respective holes formed in the partition wall 25, the existing pipe 12 and the regeneration pipe 13 have the same diameter, and the flange portion 23a of the rubber packing 23 can be mounted in the water diverting port 62 formed in the peripheral wall of the water pipe 11 in a stable manner.

By forming the center drill guide small hole 26 in the partition wall 25, even when fine vibrations are generated on the drill body 44, the drill body 44 is accurately guided by the center drill guide small hole 26 and hence, there is no possibility that rubbed portions, flaws and the like are generated on a drilled surface and the like whereby it is possible to obtain a beautiful drilled surface. Accordingly, there is no possibility that a leakage of water occurs.

After the drilling is finished, the drill of the drilling machine 43 is removed from the inside of the gate, and the valve element 22 of the gate valve 15 is closed. Further, the drilling machine 43 is removed from the snap tap 14 so that the drilling step is completed.

The diameter enlarging step which follows the drilling step is explained in detail in an embodiment 3.

Embodiment 2

Figure 11:
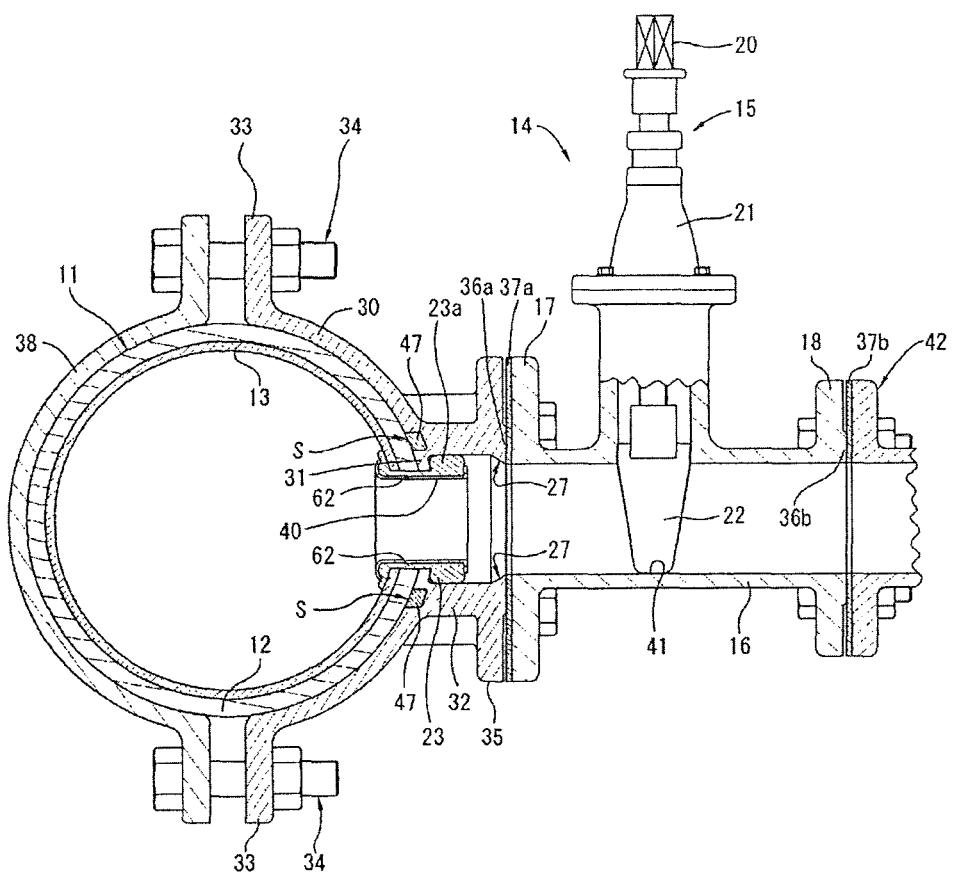
FIG. 11 is a cross-sectional view showing the whole structure of a water pipe and a snap tap according to an embodiment 2.

FIG. 11 is a cross-sectional view showing the whole structure of the water pipe 11 and the snap tap 14 according to the embodiment 2.

In this embodiment, as shown in FIG. 14, a partition wall is arranged at a center portion of a saddle 30, a snap tap 14 equipped with a gate valve 15 is fixed to a peripheral wall of the water pipe 11 by way of a saddle 30 and, thereafter, a drill body 44 (shown in FIG. 18) of a drilling machine 43 (shown in FIG. 18) is advanced into a water flow sleeve 16 of the gate valve 15 thus forming a hole in the partition wall of the saddle 30, a peripheral wall of an existing pipe 12, and a peripheral wall of a regeneration pipe 13 by drilling simultaneously. In this manner, the snap tap structure where the water pipe 11 and the snap tap 14 equipped with the gate valve 15 are integrally connected to each other is completed.

Figure 12:
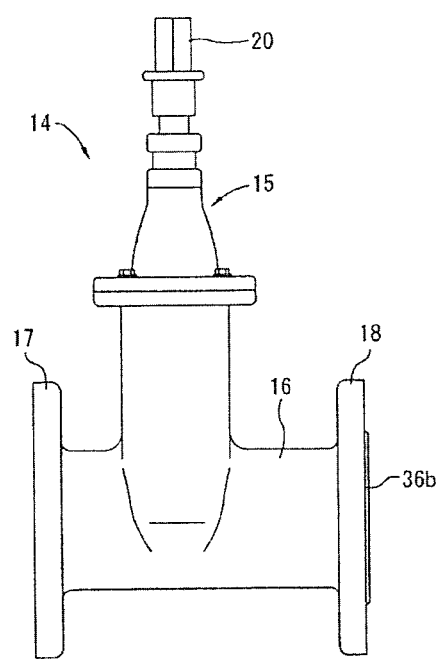
FIG. 12 is an explanatory view showing the whole structure of the snap tap equipped with a gate valve according to the embodiment 2.

FIG. 12 is an explanatory view showing the whole structure of the snap tap 14 equipped with the gate valve 15.

Figure 13:
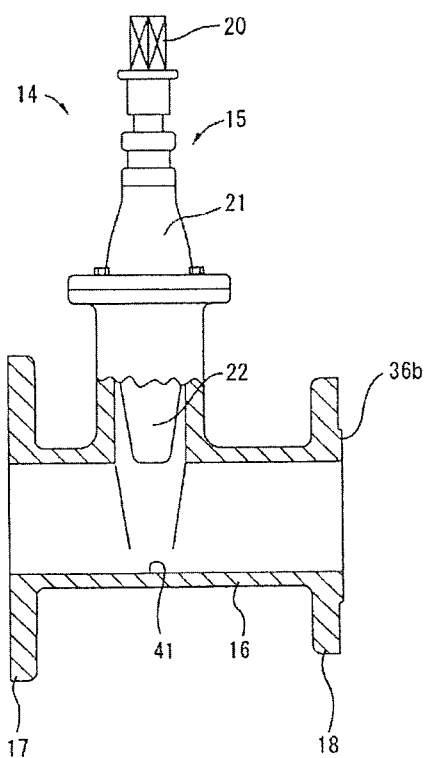
FIG. 13 is an explanatory view showing the cross-sectional structure of the snap tap equipped with the gate valve according to the embodiment 2.

FIG. 13 is an explanatory view showing the cross-sectional structure of the snap tap 14 equipped with the gate valve 15.

As shown in FIG. 12 and FIG. 13, in this embodiment, a pair of flanges is formed on both ends of the water flow sleeve 16 of the gate valve 15 respectively.

A first flange 17 is formed on one end of the water flow sleeve 16 of the gate valve 15, and a second flange 18 is formed on the other end of the water flow sleeve 16. The first flange 17 can be joined to a saddle flange 35 on a saddle 30 side.

A drilling machine 43 and a snap tap attaching tool 10 can be mounted on the second flange 18 at the time of forming the snap tap 14, and the second flange 18 is connectable with another branch pipe 42 after the snap tap 14 is formed.

[Partition Wall Structure of Saddle]

Next, the partition wall structure of the saddle 30 is explained in detail.

Figure 14A:
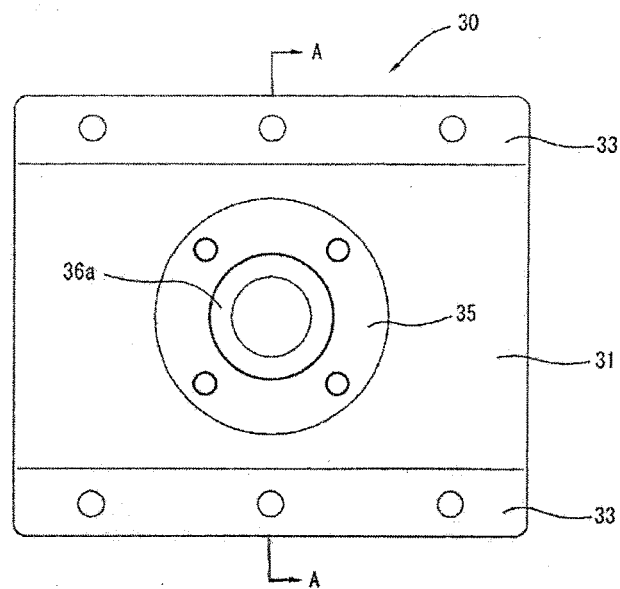
Figure 14B:
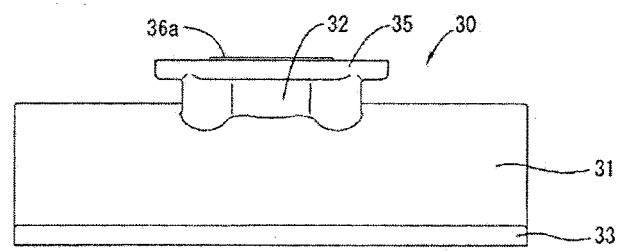
Figure 14C:
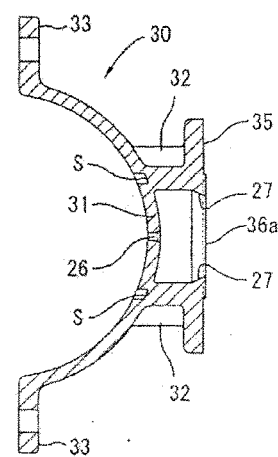
Figure 14D:
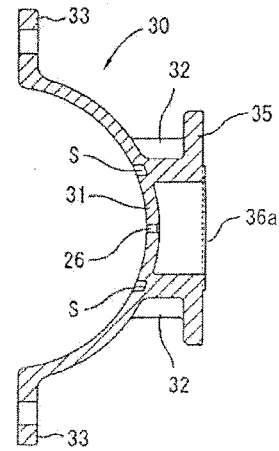

FIG. 14A is a side view showing the structure of the saddle 10, FIG. 14B is a plan view showing the structure of the saddle 30, FIG. 14C is a cross-sectional view showing the structure of the saddle 30 having a tapered inner diameter surface 27, and FIG. 14D is a cross-sectional view showing the structure of the saddle 30 having no tapered surface.

A semicircular saddle body 31 which constitutes the saddle 30 according to the present invention is formed along a curvature of an outer peripheral wall surface of the existing pipe 12 and the regeneration pipe 13, a mounting cylinder 32 is formed on a center portion of the saddle 30 in a projecting manner, a proximal portion of the mounting cylinder 32 is closed by the semicircular saddle body 31 which extends along a curvature of an outer peripheral wall surface of the water pipe 11, and a bottomed portion of the mounting cylinder 32 is formed as a partition wall. In the partition wall, a center drill guide small hole 26 (shown in FIG. 14C) which corresponds to a position to be the center of the snap tap 14 is formed by drilling.

[Detail Description of Center Drill Guide Small Hole]

The center drill guide small hole 26 has a gate valve 15 side thereof formed into a tapered shape, and has a regeneration pipe 13 side thereof formed into a straight shape.

The center drill guide small hole 26 has a diameter smaller than a diameter of a body of the center drill 45.

The small hole 26 functions as a guide for a center drill 45 at the time of forming a hole by drilling using the center drill 45.

The reason why the small hole 26 has such a function is as described in the previously-mentioned embodiment.

That is, as shown in FIG. 11, a water diverting port 62 is formed by simultaneously forming a hole in the partition wall of the saddle body 31 and the water pipe 11 by drilling at the center position of the snap tap 14.

As shown in FIG. 14C, on a saddle flange 35 side of the mounting cylinder 32 (outlet opening portion), a tapered inner diameter surface 27 having an inner diameter larger than an inner diameter of the water flow sleeve 16 of the body of the gate valve 15 is formed.

Due to such a configuration, it is possible to prevent the generation of the turbulence flow which may be generated because of the difference in inner diameter between the mounting cylinder 32 and the water flow sleeve 16 thus smoothly guiding water from the water pipe 11 to the water dividing pipe.

In this embodiment, although the saddle flange 35 side of the mounting cylinder 32 is formed into a tapered shape, the method of forming the snap tap 14 of the present invention may adopt the mounting cylinder 32 shown in FIG. 14D where the tapered inner diameter surface 27 is not formed.

[Structure of Seal Ring]

In this embodiment, a seal ring arranging space S is formed on a saddle 30 side.

As shown in FIG. 11, by arranging a seal member 47 in the seal ring arranging space S, a close-contact seal ring function is held between an outer peripheral surface of the water pipe 11 and an inner peripheral surface of the saddle 30.

[Detail Description of Core Drill Guide Hole According to Another Embodiment]

Figure 19:
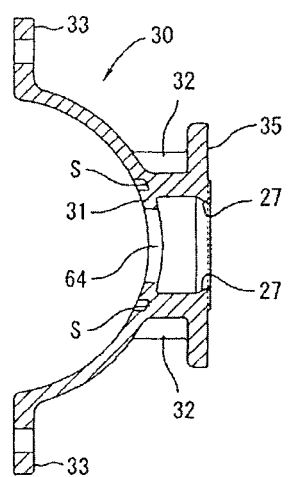
FIG. 19 is a cross-sectional view showing the cross-sectional structure of the saddle having a core drill guide hole according to the embodiment 2.

FIG. 19 is an explanatory view showing another embodiment where a core drill guide hole 64 having an approximately same diameter as the core drill 46 is preliminarily formed in the saddle body 31 before the hole is formed by drilling using the drilling machine 43.

That is, as shown in FIG. 19, this embodiment is characterized in that the core drill guide hole 64 is preliminarily and directly formed in the saddle body 31 in place of the center drill guide small hole 26 in the embodiment 2.

In this embodiment, the structures other than the structure of the core drill guide hole 64 are equal to the corresponding structures in the embodiment 2.

[Detail Description of Method of Forming Snap Tap 14]

Next, the method of forming the snap tap 14 according to the present invention is explained in detail.

The method of forming the snap tap 14 mainly includes a saddle mounting step, a gate valve mounting step, a drilling step, and a diameter enlarging step.

Figure 15:
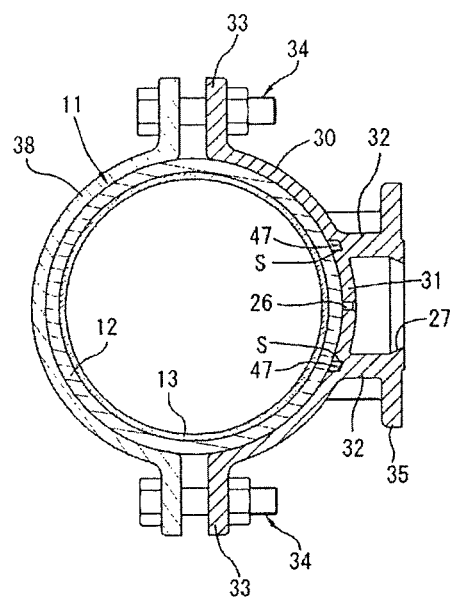
FIG. 15 is an explanatory view for explaining a state where the saddle is mounted on the water pipe according to the embodiment 2.

FIG. 15 is an explanatory view for explaining a state where the saddle 30 is mounted on the water pipe 11.

Figure 16:
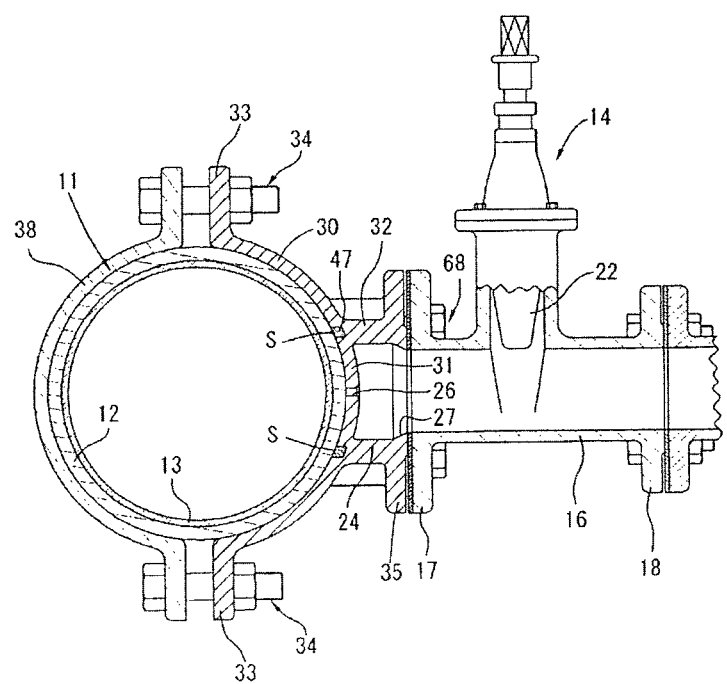
FIG. 16 is an explanatory view for explaining a state where the gate valve is assembled to the saddle according to the embodiment 2.

FIG. 16 is an explanatory view for explaining a state where the gate valve 15 is combined to the saddle 30.

The saddle mounting step and the gate valve mounting step are substantially equal to the corresponding steps in the embodiment 1.

Next, the drilling step is explained.

FIG. 17 is an explanatory view for explaining a state where the drilling machine 43 is mounted on the gate valve 15.

Further, the drilling machine 43 equipped with the core drill 46 and the center drill 45 on a distal end side of a proximal-end-side drill shaft thereof is mounted on one side of the water flow sleeve 16.

In this embodiment, steps of forming the water diverting port by drilling are substantially equal to the steps of forming the water diverting port in the partition wall 25 arranged in the projecting cylinder 55 of the gate valve 15 as well as in the water pipe 11 by drilling using the core drill 46. This embodiment differs from the above-mentioned embodiment only with respect to a point that the hole is formed in the partition wall formed in the saddle body 31 and in the outer peripheral wall of the water pipe 11 simultaneously by drilling.

In this manner, by forming the hole in the saddle body 31, the existing pipe 12 and the regeneration pipe 13 simultaneously, the water diverting port 62 can be formed by drilling.

Embodiment 3

Hereinafter, one example of a water diversion attaching tool according to this embodiment is explained with reference to drawing.

In the previously-mentioned embodiments 1 and 2, the explanation of the jig has been made with respect to the communicable connecting structure between the water pipe 11 and the gate vale 15 which constitutes the snap tap communicably connected to a lateral side wall of the water pipe with reference to the drawings. Unlike the explanation of the previously-mentioned embodiments 1 and 2, the jig of the embodiment 3 is explained as a jig which is used in a water diving port extending in a longitudinal direction with reference to FIG. 20 and subsequent drawings. That is, the explanation is made with respect to the case that a snap tap attaching tool is used in the vertical snap tap mounting structure where the snap tap is communicably connected to a horizontally-arranged water pipe 11 right above the water pipe 11, and a rubber packing 23 and a metal sleeve 40 are mounted in a vertical water diverting port formed in a peripheral wall of the water pipe 11 from the vertical direction and, in such a state, the rubber packing 23 and the metal sleeve 40 are caulked.

[Configuration of Snap Tap Attaching Tool]

Figure 20:
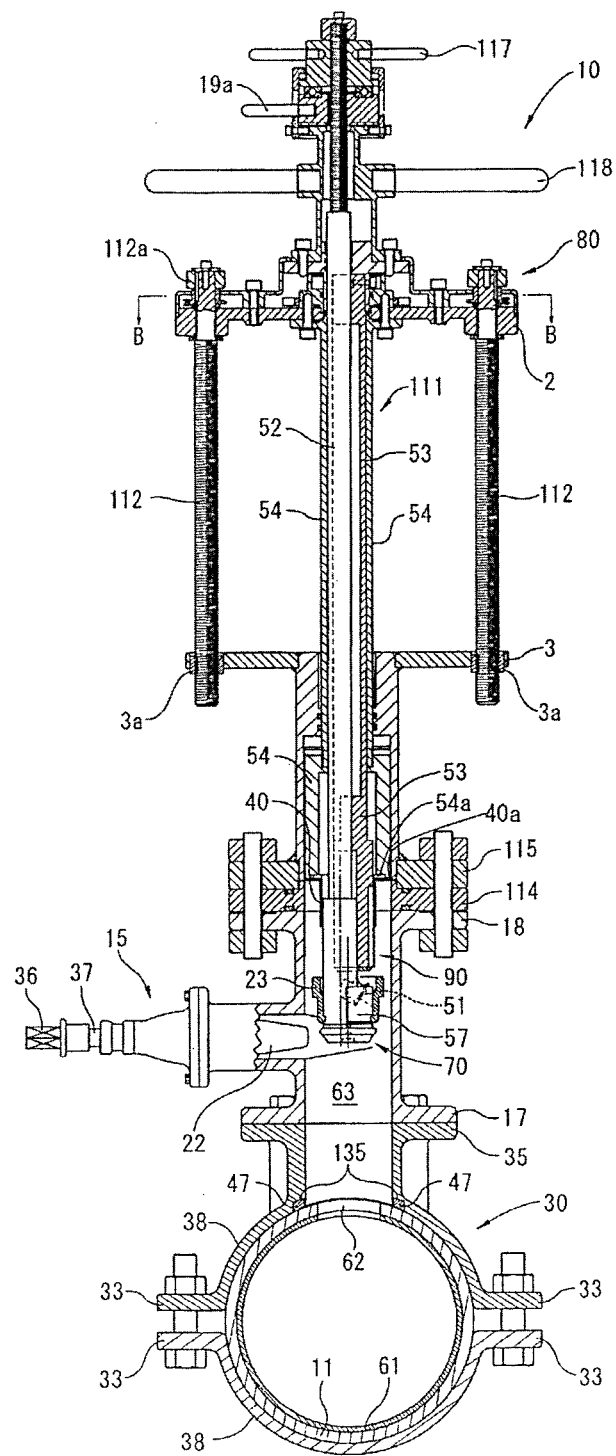
FIG. 20 is a cross-sectional view showing the internal structure of a snap tap attaching tool in an embodiment 3.

Hereinafter, the constitution of the snap tap attaching tool according to this embodiment is explained with reference to FIG. 20. FIG. 20 is a cross-sectional view showing the constitution of the snap tap attaching tool and a state where the snap tap attaching tool is connected to a gate valve.

As shown in FIG. 20, a handle operating mechanism where various kinds of handles (a pull-up handle 117, a diameter enlarging handle 118) are collectively arranged is disposed on an upper portion of the snap tap attaching tool 10 according to this embodiment. An upper flange 2 is mounted on a lower portion of the handle operating mechanism, and a lower flange 3 is arranged below the upper flange 2 with a predetermined gap therebetween in the longitudinal direction of the snap tap attaching tool 10. The lower flange 3 is integrally connected to the second flange 18 on an upper end of the gate valve 15 with a mounting plate 115 and a positioning flange 114 interposed therebetween.

A main shaft 111 is disposed at the center of the snap tap attaching tool 10 in the longitudinal direction in a downwardly extending manner. The upper flange 2 is fixedly mounted on an upper portion of the main shaft 111 and, as described previously, the lower flange 3 is connected and fixed to the gate valve 15. As the lifting mechanism for displacing the main shaft 111 in the vertical direction, two screws 112, 112 having trapezoidal threads are mounted on a rectangular flame shape, and two screws 112, 112 extend between the upper and lower flanges 2, 3.

The screws 112, 112 having trapezoidal threads are threadedly engaged with the fixed lower flange 3 through engaging holes 3a respectively.

Upper ends of the screws 112 having trapezoidal threads which penetrate the upper flange 2 and project from the upper flange 2 are rotatable. By rotating rotational portions 112a of the upper end of the screw 112 having trapezoidal threads using a dedicated tool, the upper flange 2 and the main shaft 111 move upwardly or downwardly together with the screws 112 having trapezoidal threads.

Figure 21:
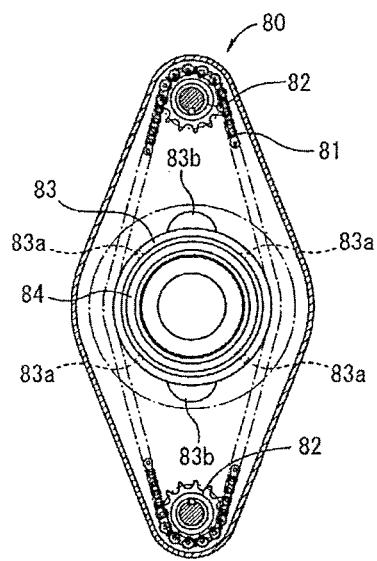
FIG. 21 is a view for explaining an interlocking mechanism in the embodiment 3.
Figure 22:
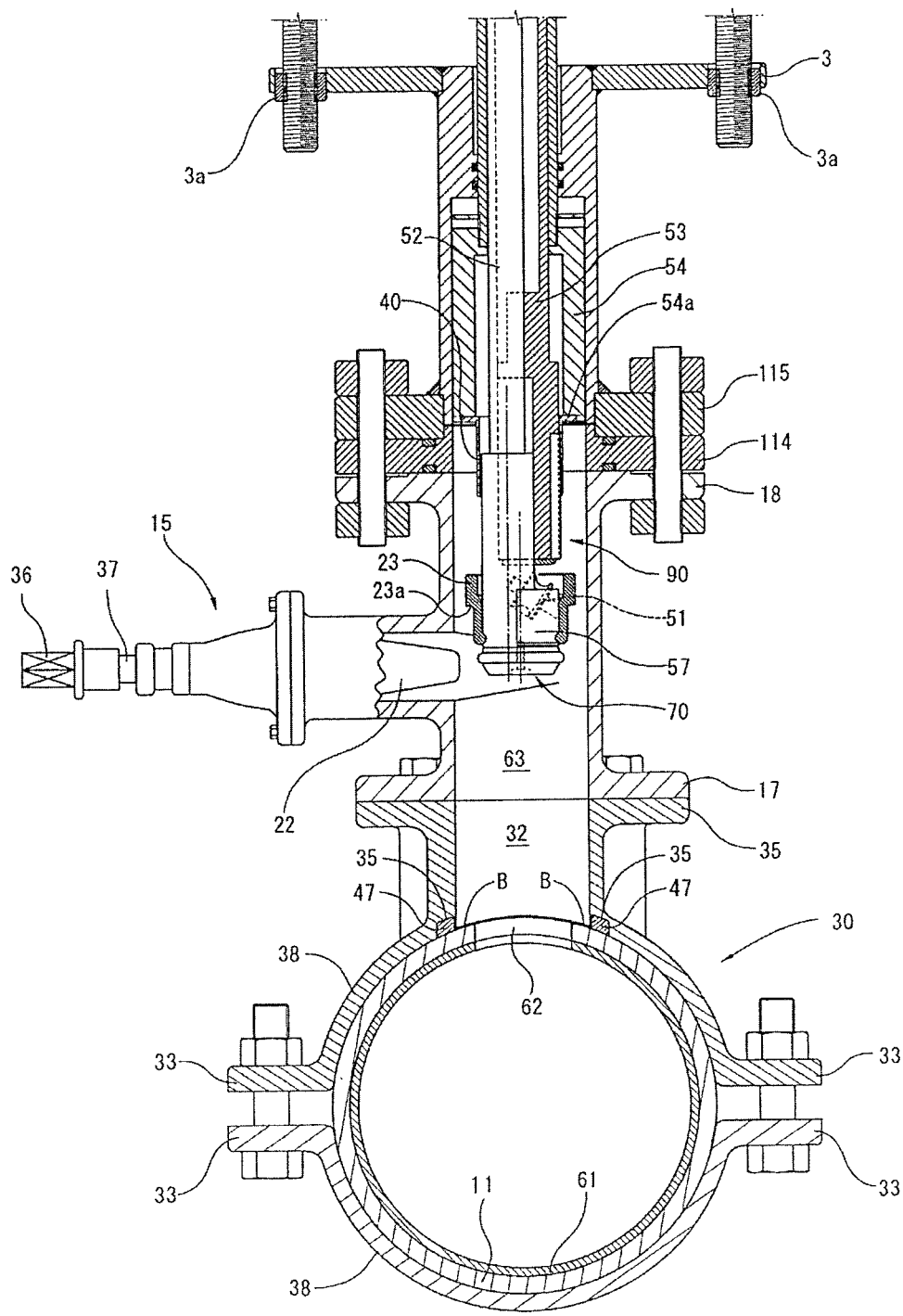
FIG. 22 is a view for explaining a step of forming a snap tap using the snap tap attaching tool in the embodiment 3.

As shown in FIG. 21, on the upper flange 2, upper portions of two screws 112 having trapezoidal threads are connected to each other in an interlocking manner by an interlocking mechanism 80.

In the drawing, symbol 80 indicates the interlocking mechanism, symbols 82, 82 indicate sprockets, symbol 81 indicates a chain, symbol 83 indicates a chain tension adjusting tool, and symbol 83a indicates a fixing screw.

Due to the provision of the interlocking mechanism 80, when the rotational portion 112a formed on the upper end of one screw 112 having trapezoidal threads is rotated using the dedicated tool, the other screw 112 having trapezoidal threads is also rotated in an interlocking manner with one screw 112 at the same pitch so that the screws 112 having trapezoidal threads which are threadedly engaged with the fixed lower flange 3 are elevated or lowered. Due to the elevation or lowering of the screws 112, the upper flange 2 is elevated or lowered together with the main shaft 111.

The main shaft 111 is constituted of: a sleeve pushing pipe 54; an eccentrically movable shaft 52 which is inserted in the sleeve pushing pipe 54; and an eccentrically movable bearing 53 which is interposed in a cross-sectional space formed between the eccentrically movable shaft 52 and the sleeve pushing pipe 54 and stably supports the eccentrically movable shaft 52 in the inside of the sleeve pushing pipe 54.

An eccentric diameter enlarging head 57 which is simultaneously rotated due to the rotation of the eccentrically movable shaft 54 is connected to a lower end of the eccentrically movable shaft which is inserted into the sleeve pushing pipe 54. The rubber packing 23 is mounted on a peripheral surface of the diameter enlarging head 57 in a detachable manner, and the metal sleeve 40 is loosely fitted in a gap formed between an inner peripheral surface of an upper portion of the rubber packing 23 and a peripheral surface of the diameter enlarging head 57.

A lower portion of the sleeve pushing pipe 54 is formed into a cylindrical shape having a wall thickness larger than a wall thickness of an upper portion of the sleeve pushing pipe 54, and a contact end 54a on a lower end of the sleeve pushing pipe 54 is configured to be brought into contact with a flange 40a which forms a head portion of the metal sleeve 40 fitted in the rubber packing 23.

A diameter enlarging roller 51 is mounted on the diameter enlarging head 57 in an inclined manner toward an oblique upward direction.

Although the detailed constitution of the diameter enlarging roller 51 is described later, the diameter enlarging roller 51 is formed into a Japanese hand drum shape by joining a plurality of roller pieces having a sliced ring shape to each other. The respective roller pieces are configured to be rotatable independently from each other.

Further, a guide member 70 for allowing the diameter enlarging head 57 to smoothly and accurately enter the water diverting port 62 is connected to a distal end of a lower portion of the diameter enlarging head 57 (that is, a distal end which is inserted into the water diverting port 62 formed in the water pipe 11 by drilling).

Since the eccentrically movable shaft 52 rotates in an eccentric manner from the center of the main shaft 111, the diameter enlarging roller 51 which is mounted on the diameter enlarging head 57 in an inclined manner can project to the outside of an outer diameter of the main shaft 111, that is, an outer diameter of the sleeve pushing pipe 54 or retract to the inside of the outer diameter of the main shaft 111, that is, the outer diameter of the sleeve pushing pipe 54.

That is, when the diameter enlarging roller 51 is retracted to the cross-sectional space formed between the eccentrically movable shaft 52 and the sleeve pushing pipe 54, the diameter enlarging head 57 can pass through the water diverting port 62 while keeping such a state. Thereafter, by allowing the diameter enlarging head 57 to advance forward from the water diverting port and by rotating the diameter enlarging roller 51, the diameter enlarging roller 51 is brought into a state where the diameter enlarging roller 51 projects outward from the cross-sectional space formed between the eccentrically movable shaft 52 and the sleeve pushing pipe 54. In this manner, the diameter enlarging roller 51 can be displaced to a position where the diameter enlarging roller 51 can caulk the rubber packing 23 and the metal sleeve 40 which are positioned around the water diverting port.

A seizure preventing member 90 for preventing a seizure brought about by a friction between an outer peripheral surface of the eccentrically movable bearing 53 and an inner peripheral surface of the metal sleeve 40 is mounted on the outer peripheral surface of the eccentrically movable bearing 53 which is brought into contact with the inner peripheral surface of the metal sleeve 40. The detail constitution of the seizure preventing member 90 is also described later.

On an upper portion of the snap tap attaching tool 10, handles for respectively operating the sleeve pushing pipe 54, the eccentrically movable shaft 52 (diameter enlarging head 57), the eccentrically movable bearing 53 and the like which constitute the main shaft 111 are collectively arranged as the handle operating mechanism. Symbol 117 indicates the pull-up handle, and symbol 118 indicates the diameter enlarging handle.

The pull-up handle 117 is provided for projecting or retracting the diameter enlarging roller 51 which is mounted on the diameter enlarging head 57 in an inclined manner to the outside or the inside of the outer diameter of the main shaft 111 by eccentrically rotating the eccentrically movable shaft 52.

The pull-up handle 117 is provided also for deforming the distal-end opening portion of the metal sleeve 40 which is made to advance to the inside of the water pipe 11 with a predetermined pressure of the diameter enlarging roller 51 which is mounted on the diameter enlarging head 57 in an inclined manner by performing a pull-up operation of the diameter enlarging head 57 which advances to the outside of the outer diameter of the main shaft 111.

The diameter enlarging handle 118 is provided for bending the distal-end opening portion of the metal sleeve 40 in an outwardly folded-back state by rotating the main shaft 111 while bringing the diameter enlarging roller 51 mounted on the diameter enlarging head 57 in an inclined manner into contact, with the distal-end opening portion of the metal sleeve 40.

In the drawing, symbol 19a indicates a lever for changing over a mode of the operation between a state where the eccentrically movable shaft 52 can be rotated singly and a state where the eccentrically movable shaft 52 and the eccentrically movable bearing 53 can be rotated integrally with each other.

The snap tap attaching tool 10 is mounted on the gate valve 15 by way of the positioning flange 114, a mounting plate 115 on a lower end of the snap tap attaching tool 10, the second flange 18 of the gate valve 15 and the like.

[Snap Tap Forming Step]

Figure 23:
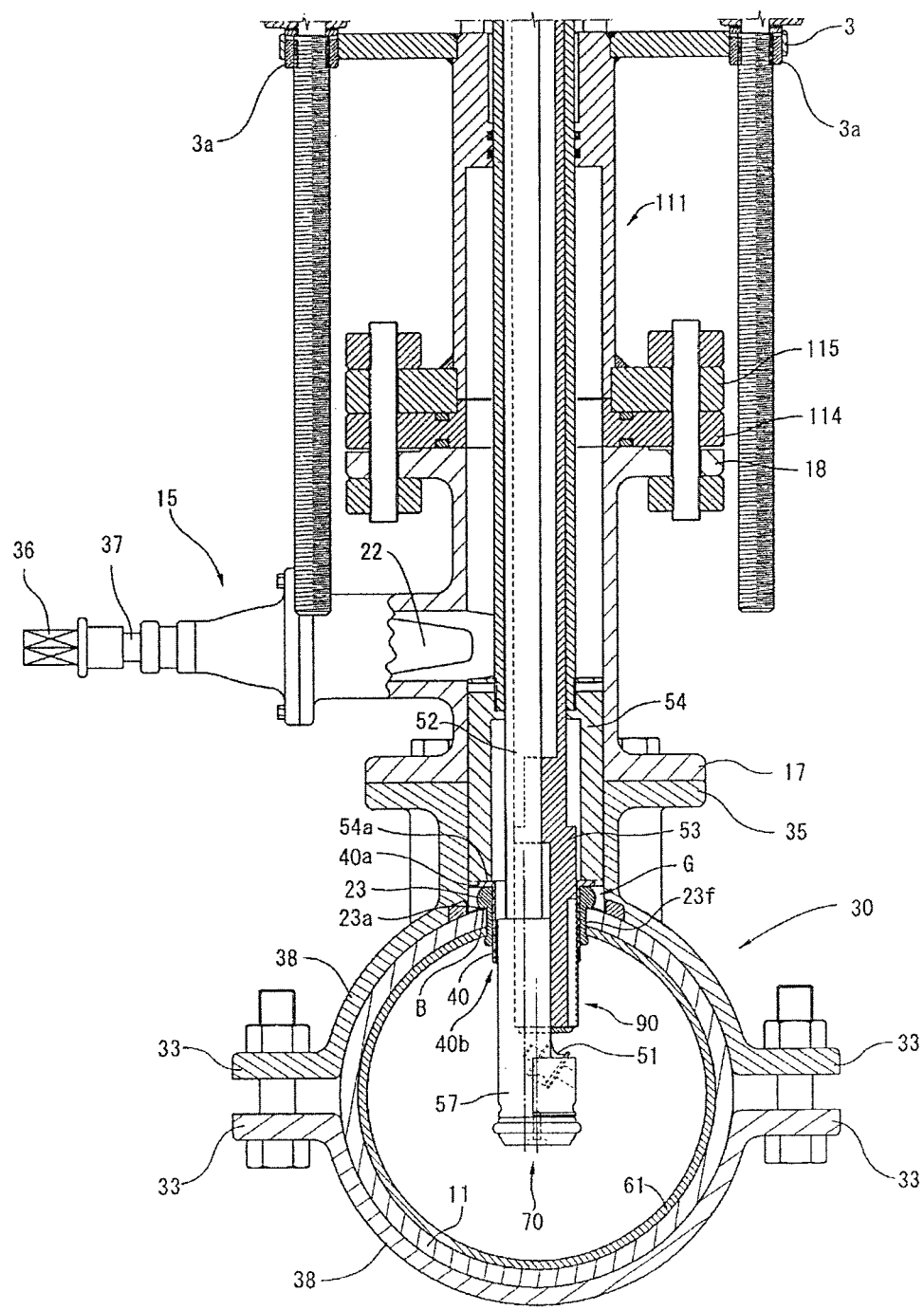
FIG. 23 is a view for explaining a step of forming the snap tap using the snap tap attaching tool in the embodiment 3.

As shown in FIG. 23, the rubber packing 23 on the lower end of the main shaft 111 moves to the water diverting port 62 below the rubber packing 23 due to a lowering action of the above-mentioned lifting mechanism.

Then, a flange portion 23a of the rubber packing 23 is brought into contact with a peripheral surface B of the water diverting port 62 by the contact end 54a of the sleeve pushing pipe 54 and, thereafter, by further pushing the flange portion 23a so as to compress the flange portion 23a, a mounting portion 23f of the rubber packing 23 is inserted into the water diverting port 62.

In this embodiment, a rubber packing housing space G for retaining the flange portion 23a of the rubber packing 23 therein is formed in the mounting cylinder 32 (see FIG. 23) and, further, the flange portion 23a is formed in an elongated manner and hence, there is no possibility that the rubber packing 23 enters the inside of the water pipe 11 from the water diverting port 62. Further, due to a dividing ring 23b described later which is mounted on the flange portion 23a of the rubber packing 23, the flange portion 23a of the rubber packing 23 can withstand a strong insertion pressure of the metal sleeve 40.

Further, when the metal sleeve 40 is pushed into the rubber packing 23 using the sleeve pushing pipe 54 by lowering the main shaft 111 in a state where the contact end 54a of the sleeve pushing pipe 54 and an outer-flange-shaped flange 40a formed on a head portion of the metal sleeve 40 are brought into contact with each other, the distal-end opening portion 40b of the metal sleeve 40 passes the inner periphery of the rubber packing 23 and projects to the inside of the water pipe 11.

Figure 33:
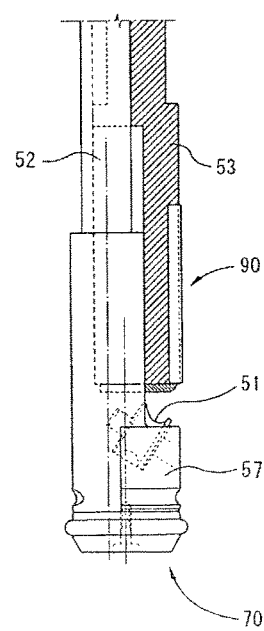
FIG. 33 is a view showing a state where a diameter enlarging head is housed in the embodiment 3.

At this stage of the operation, the diameter enlarging head 57 disposed on the lower end of the main shaft 111 is brought into a state where the diameter enlarging head 57 projects to the further inside of the water pipe 11 from the water diverting port 62 than the distal-end opening portion 40b of the metal sleeve 40 which projects to the inside of the water pipe 11 from the water diverting port 62. In such a state, as shown in FIG. 33, the diameter enlarging head 57 is brought into a state where the diameter enlarging roller 51 mounted on the diameter enlarging head 57 in an inclined manner is retracted to the inside of the outer diameter of the main shaft 111.

The rubber packing housing space G becomes a space for preserving a compression force of the rubber packing 23 when the flange portion 23a of the rubber packing 23 is compressed. By disposing the rubber packing housing space G as described above, it is possible to preserve an elasticity of the rubber packing 23 generated by the compression of the flange portion 23a.

Figure 24:
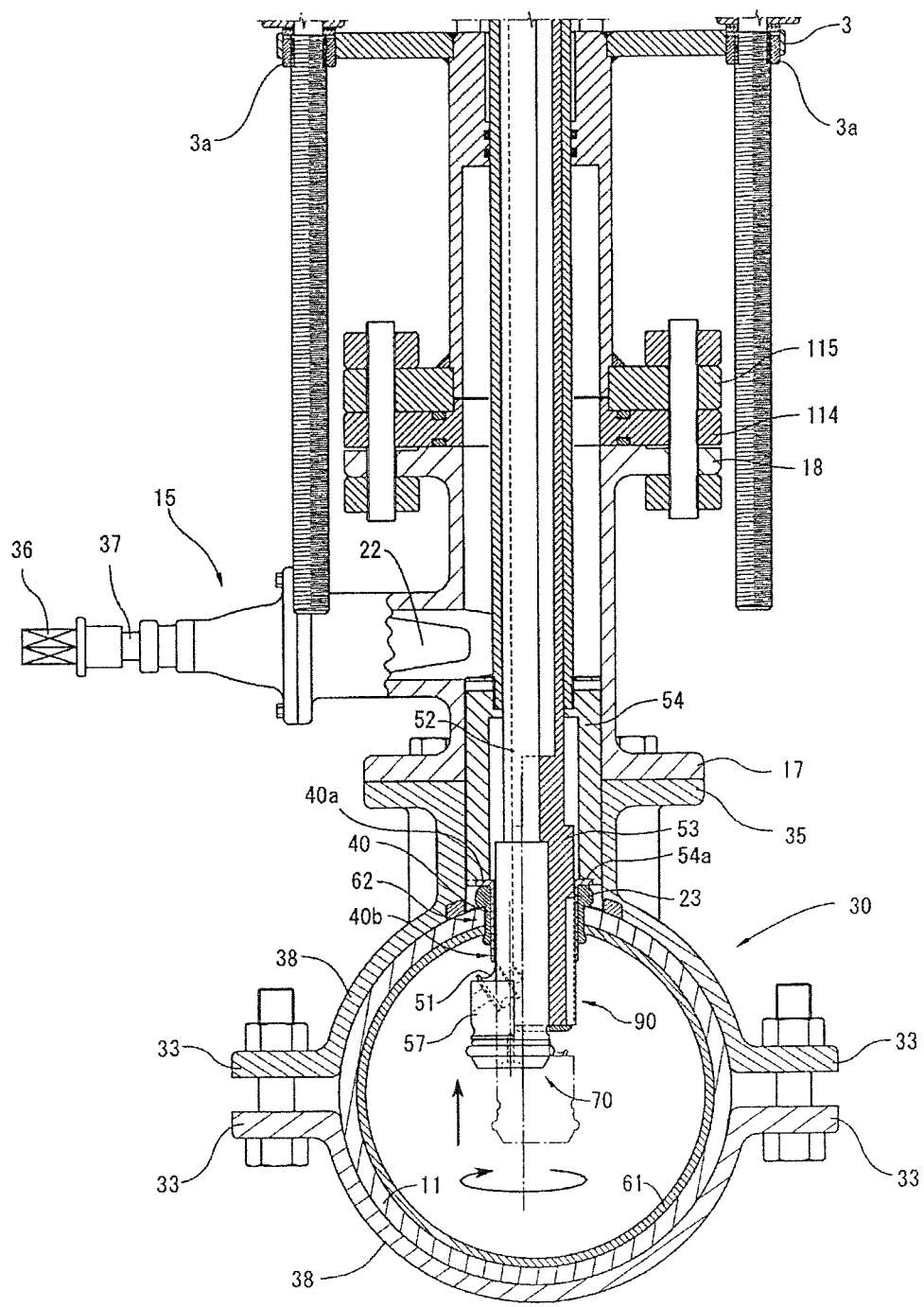
FIG. 24 is a view for explaining a step of forming the snap tap using the snap tap attaching tool in the embodiment 3.
Figure 34:
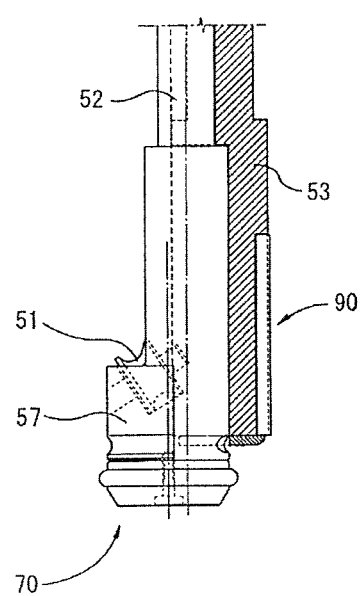
FIG. 34 is a view showing a diameter enlarging state of the diameter enlarging head in the embodiment 3.

Subsequently, as shown in FIG. 24, by rotating the eccentrically movable shaft 52 by an approximately 180 degrees, as shown in FIG. 34, the diameter enlarging roller 51 mounted on the diameter enlarging head 57 in an inclined manner is made to advance to the outside of the outer diameter of the main shaft 111. Further, by operating the pull-up handle 117 (see FIG. 20), the diameter enlarging roller 51 is brought into contact with the distal-end opening portion 40b of the metal sleeve 40 by a predetermined pressure.

Figure 25:
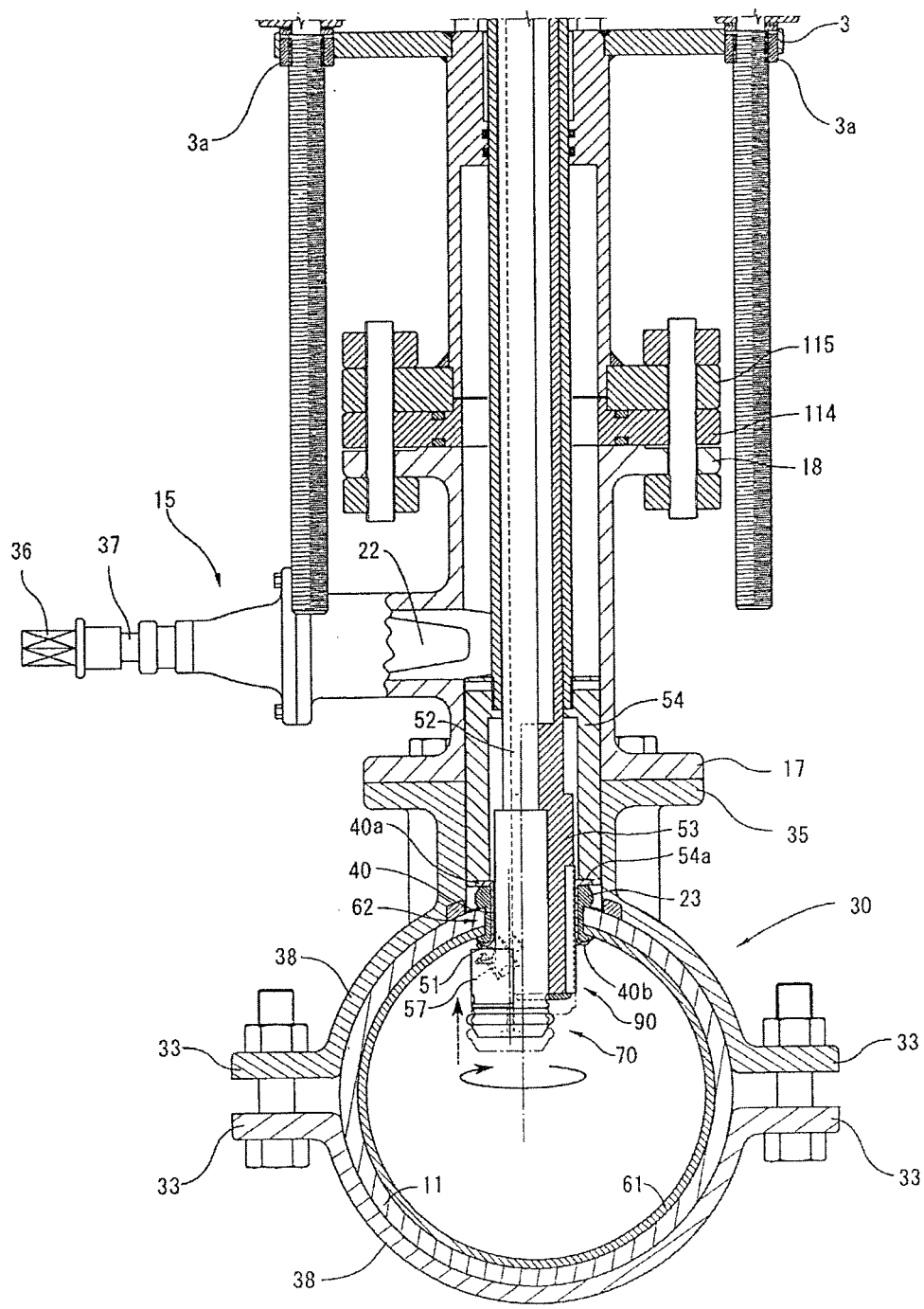
FIG. 25 is a view for explaining a step of forming the snap tap using the snap tap attaching tool in the embodiment 3.

Further, by operating an integral lock mechanism, the eccentrically movable shaft 52 and the eccentrically movable bearing 53 are locked such that the eccentrically movable shaft 52 and the eccentrically movable bearing 53 are rotated integrally with each other, and by rotating the diameter enlarging handle 118 (see FIG. 20), the eccentrically movable shaft 52 and the eccentrically movable bearing 53 are rotated integrally with each other. By repeating such an operation a predetermined number of times, as shown in FIG. 25, a diameter of the distal-end opening portion 40b of the metal sleeve 40 is expanded in a downwardly spreading manner so that the metal sleeve 40 is caulked to the water diverting port 62 of the water pipe 11 together with the rubber packing 23. That is, by rotating the main shaft 111 while bringing the diameter enlarging roller 51 into contact with an outer peripheral edge of the opening portion 40b of the metal sleeve 40 which projects to the inside of the water pipe 11 in a state where the diameter enlarging roller 51 advances to the outside of the outer diameter of the main shaft 111, the distal-end opening portion 40b of the metal sleeve 40 can be folded toward the outside in a fold-back manner.

When the enlarging operation is finished, by operating the pull-up handle 117 (see FIG. 20), an operation in the direction opposite to the above-mentioned operation is performed so that the diameter enlarging roller 51 is retracted to the inside of the outer diameter of the main shaft 111 (see FIG. 33). Then, the main shaft 111 is made to advance to a position where the valve element 22 of the gate valve 15 can cut-off a water diverting passage 63 using the lifting mechanism thus cutting off the flow of water to the water diverting passage 63 from the water pipe 11.

Finally, the snap tap attaching tool 10 mounted on the second flange 18 of the gate valve 15 is removed from the second flange 18 together with the positioning flange 114, and the operation of forming the snap tap 14 is finished.

Figure 26:
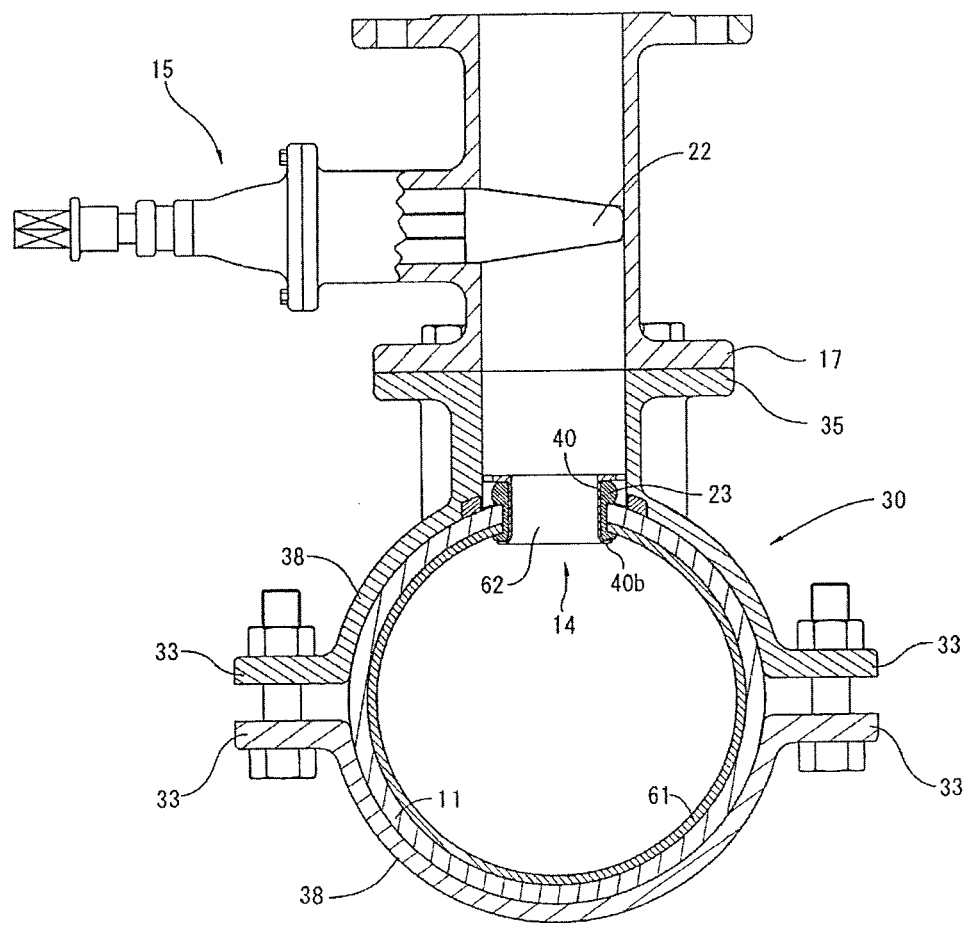
FIG. 26 is a view for explaining a step of forming the snap tap using the snap tap attaching tool in the embodiment 3.
Figure 27:
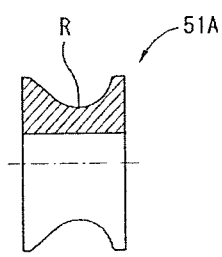
FIG. 27 is a view showing the constitution of a conventional diameter enlarging diameter.

That is, as shown in FIG. 26, by enlarging a diameter of the distal-end opening portion 40b of the metal sleeve 40 in a downwardly spreading manner, the snap tap 14 where the metal sleeve 40 is integrally caulked to the water diverting port 62 of the water pipe 11 together with the rubber packing 23 is formed.

Then, a tap water branch pipe (not shown in the drawing) is connected to the second flange 18 of the gate valve 15 and, thereafter, the gate valve 15 is opened so that water flows toward the water diverting passage 63 from the water pipe 11 in a diverting manner.

[Constitution of Diameter Enlarging Roller]

Hereinafter, the constitution of the diameter enlarging roller 51 according to the present invention is explained with reference to FIG. 27 to FIG. 30.

Figure 28:
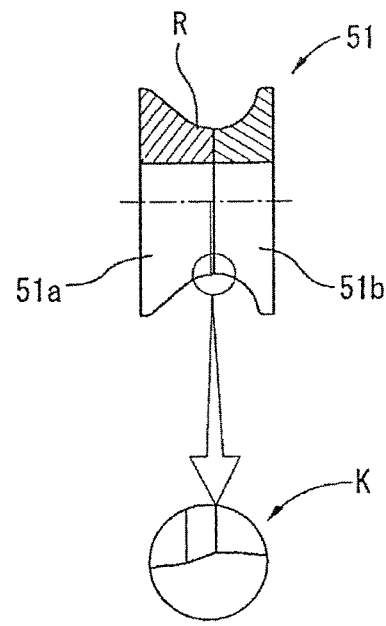
FIG. 28 is a view showing the constitution of a diameter enlarging diameter in the embodiment 3.
Figure 29:
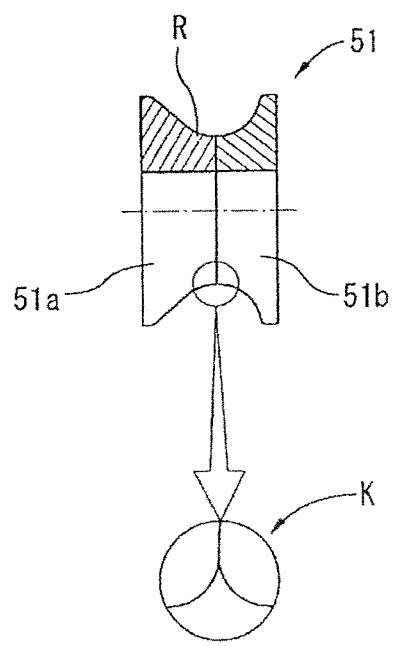
FIG. 29 is a view showing the constitution of the diameter enlarging diameter in the embodiment 3.

As shown in FIG. 28 and FIG. 29, the diameter enlarging roller 51 according to the present invention is formed of two identical roller pieces 51a, 51b which together form the diameter enlarging roller 51 of a Japanese hand drum shape as an integral body, and the respective roller pieces 51a, 51b are configured to be rotatable independently from each other. In FIG. 28, a slight straight step is formed on contact ends K of the respective roller pieces 51a, 51b. In FIG. 29, the contact ends K of the respective roller pieces 51a, 51b are formed into a round shape. When the roller pieces 51a, 51b are configured to be dividable at the center of the diameter enlarging roller 51 as described above, a diameter enlarging surface R can be divided into a tapered portion which is formed on a left side with respect to the center of the diameter enlarging surface R, and a round portion which is formed on a right side with respect to the center of the diameter enlarging surface R thus preventing the increase of a diameter expansion preventing force of the diameter enlarging roller 51 with which a diameter enlarging surface of the distal-end opening portion 40b is brought into contact.

In this manner, since the diameter enlarging roller 51 is constituted of the separate roller pieces 51a, 51b, even when there exists the difference in contact resistance applied to the diameter enlarging roller 51 between respective portions of the diameter enlarging surface R due to the difference in circumferential length, the respective roller pieces 51a, 51b are independently rotated corresponding to contact resistances respectively and hence, it is possible to prevent the increase of the contact resistance of the diameter enlarging roller 51 as a whole.

Figure 30:
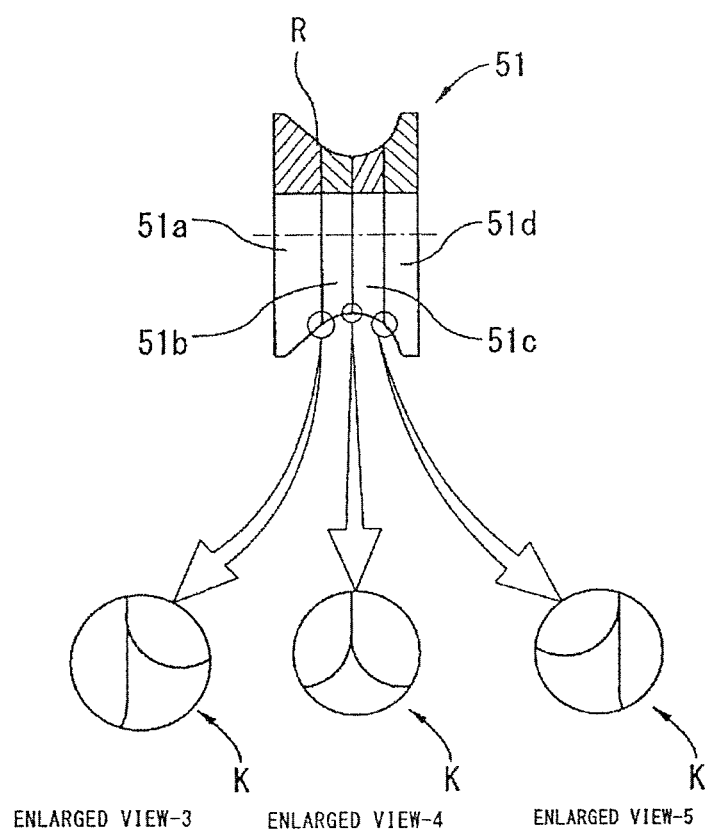
FIG. 30 is a view showing the constitution of the diameter enlarging diameter in the embodiment 3.

Accordingly, it is desirable to increase the number of divisions of the diameter enlarging roller 35. As shown in FIG. 30, wherein the diameter enlarging roller 51 is an integral body consisting of four roller pieces 51a, 51b, 51c, 51d which together form a Japanese, hand drum shape, by configuring the respective roller pieces 51a, 51b, 51c, 51d such that these roller pieces 51a, 51b, 51c, 51d are rotatable independently from each other, an advantageous effect of preventing the increase of a diameter expansion preventing force of the diameter enlarging roller 51 can be improved. In FIG. 30, contact ends K of the respective roller pieces 51a, 51b, 51c, 51d are formed into a round shape.

According to the above-described diameter enlarging roller 51 of this embodiment, it is possible to enlarge a diameter of the distal-end opening portion 40b of the metal sleeve 40 with a small rotational force. Further, buckling which occurs at the time of enlarging a diameter of the distal-end opening portion 40b of the metal sleeve 40 can be eliminated and hence, it is possible to increase an accuracy of a diameter expansion amount.

[Constitution of Metal Sleeve and Rubber Packing]

Figure 31:
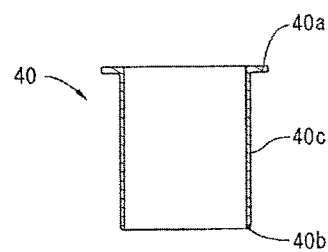
FIG. 31 is a view showing the constitution of a metal sleeve in the embodiment 3.
Figure 32:
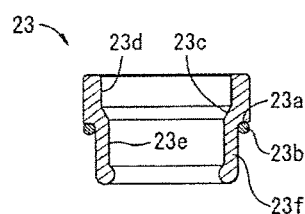
FIG. 32 is a view showing the constitution of a rubber packing in the embodiment 3.

Hereinafter, the constitution of the metal sleeve 40 and the constitution of the rubber packing 23 according to the present invention are explained with reference to FIG. 31 and FIG. 32. FIG. 31 is a cross-sectional view showing the structure of the metal sleeve 40 of the present invention. FIG. 32 is a cross-sectional view showing the structure of the rubber packing 23 in the present invention on which the dividing ring 23b is mounted.

As shown in FIG. 31, the outer-flange-shaped flange 40a is formed on an upper end of the metal sleeve 40. The flange 40a is brought into contact with the contact end 54a of the sleeve pushing pipe 54 and projects the distal-end opening portion 40b of the metal sleeve 40 into the inside of the water pipe 11 along with the elevating and lowering action of the sleeve pushing pipe 54. Further, the flange 40a is formed for engaging the rubber packing 23 to the metal sleeve 40 by corning into contact with the upper end of the rubber packing 23.

The metal sleeve 40 is formed of a cylindrical body with the outer peripheral surface 40c thereof used as a margin for mounting the metal sleeve 40 on an inner peripheral surface of the rubber packing 23.

A metal sleeve 40 according to another embodiment is formed of a cylindrical body, and an outer-flange-shaped flange portion 40a is mounted on an upper end of the metal sleeve 40 in a projecting manner and, further, a distal-end opening end surface 40b is formed into a wave-like concavo-convex shape.

That is, as shown in FIG. 42, left and right half end surfaces 40g of the circular annular distal-end opening end surface 40b are respectively formed into a semi-arcuate recessed shape substantially extending along the inner peripheral portion of the water pipe 11. On the other hand, upper and lower half end surface portions 40h of the circular annular distal-end opening end surface 40b are respectively formed into a semi-arcuate projecting shape substantially extending along the longitudinal direction of the inner peripheral surface of the water pipe 11.

As shown in FIG. 32, the rubber packing 23 is constituted of the flange portion 23a forming an upper half portion of the rubber packing 23 and the mounting portion 23f forming a lower half portion of the rubber packing 23. The rubber packing 23 is formed into a cylindrical shape such that an inner peripheral surface of the upper half portion is constituted as a margin 23d for loosely fitting the metal sleeve 40 in the rubber packing 23, and an inner peripheral surface of the lower half portion is constituted as a margin 23e for the fitting with a peripheral surface of a lower end portion of the main shaft 111. The margin 23d and the margin 23e have the substantially same wall thickness, and the step portion 23c where a diameter is set larger than a diameter of the margin 40e for loosely fitting the metal sleeve 40 in the rubber packing 23 is formed on the inside of the rubber packing 23 at the boundary between the margin 23d and the margin 23e.

The flange portion 23a which constitutes a narrowed step portion is formed on the outer periphery of the rubber packing 23 at a position in the vicinity of a lower end of the step portion 23c formed on the inside of the rubber packing 23, and a circular annular notched portion (D portion) is formed on the flange portion 23a so that the dividing ring 23b can be fitted on the flange portion 23a. The dividing ring 23b is configured to have a function of preventing the metal sleeve 40 from advancing from a predetermined position of the rubber packing 23.

By mounting the dividing ring 23b on the rubber packing 23, the dividing ring 23b functions to push the rubber packing 23 from the outer periphery of the rubber packing 23 and hence, the flange portion 23a of the rubber packing 23 can withstand a high insertion pressure of the metal sleeve 40. Further, with the use of the dividing ring 23b, an outer diameter of the flange portion 23a of the rubber packing 23 can be decreased and hence, it is possible to realize the further miniaturization of the gate vale 15.

An end surface of the lower end opening of the rubber packing 23 according to another embodiment is formed into a wave-like shape so as to correspond to the metal sleeve 40 according to another embodiment. That is, as shown in FIG. 41, the left and right half end surface portions are respectively formed of a half-end-surface-shaped recessed portion 23*g* having a shape substantially extending along the inner peripheral surface of the water pipe 11. On the other hand, upper and lower half end surface portions are respectively formed of a semi-arcuate projecting portion 23*h* having a shape substantially extending along the longitudinal direction of the inner peripheral surface of the water pipe 11.

[Constitution of Guide Member]

Hereinafter, the constitution of the guide member 70 according to the present invention is explained with reference to FIG. 35 and FIG. 36. FIG. 35 is a view showing a state where the guide member 70 is mounted on a lower end of the diameter enlarging head 57. FIGS. 36A and 36B are views for explaining the constitution of the guide member 70, FIG. 36A being an exploded view.

As shown in FIGS. 35A and 35B, the guide member 70 which is constituted of a base 71, an elastic guide member 72 and a tapered guide member 73 is integrally mounted on the lower end of the diameter enlarging head 57 using a bolt 74. These members have a function of advancing with high accuracy the rubber packing 23 mounted on the diameter enlarging head 57 to the water diverting port 62 formed in the water pipe 11 by drilling.

As shown in FIG. 36A, the base 71 is provided for mounting the elastic guide member 72 on the distal end of the diameter enlarging head 57 in a stable manner, and a fitting portion 71*a* fitted in the elastic guide member 72 is formed on the center of the base 71.

The elastic guide member 72 is formed into a ring shape using an elastic member whose diameter is decreased correspondingly to a pressure applied to the elastic guide member 72. The elastic guide member 72 is mounted on the base 71 by fitting the fitting portion 71*a* of the base 71 in a hole 72*a* formed in the center of the elastic guide member 72.

The tapered guide member 73 is formed into an inverted trapezoidal cylindrical shape where a bottom side is set as a short side and an upper side is set as a long side, and is mounted on a lower surface of the fitting portion 71*a* of the base 71. In mounting the tapered guide member 73 on the base 71, bolts are made to pass through three mounting holes 73*a* formed in the tapered guide member 73 in a penetrating manner and are engaged with three mounting holes 71*b* formed in a lower surface of the fitting portion 71*a* of the base 71 thus connecting the tapered guide member 73 to the base 71.

The elastic guide member 72 is a member for guiding the rubber packing 23 mounted on the diameter enlarging head 57 to the water diverting port 62 formed in the water pipe 11 by drilling, and has a radius larger than an inner diameter of the metal sleeve 40.

The tapered guide member 73 has an inverted trapezoidal shape where a lower side is short, is made of a hard material such as metal, and functions such that the diameter enlarging head 57 can be smoothly inserted into the water diverting port 62 even when a center axis of the water diverting port 62 and an axis of the main shaft 111 are displaced from each other within a range of tolerance.

An outer diameter of the tapered guide member 73 is set smaller than an inner diameter of the metal sleeve 40.

The elastic guide member 72 is configured to narrow a diameter thereof corresponding to a pressure and hence, the elastic guide member 72 can accurately guide the distal end of the rubber packing 23 to the water diverting port 62. Also after the enlargement of the diameter of the distal-end opening portion of the metal sleeve 40 is finished, since the diameter of the elastic guide member 72 which is larger than the inner diameter of the metal sleeve 40 is narrowed correspondingly to a pressure, the elastic guide member 72 can be removed from the water diverting port 62.

That is, by mounting the guide member 70 having the above-mentioned constitution on a lower surface of the diameter enlarging head, even when the axial deviation is generated between the center axis of the water diverting port 62 and the center axis of the main shaft 111 within a range of tolerance, the lower end of the main shaft 111 can be inserted into the water diverting port 62 and hence, the distal end of the rubber packing 23 can be accurately guided to the water diverting port 62 by the elastic guide member 72. Due to such a configuration, the deviation can be automatically adjusted such that the center axis of the water diverting port 62 and the center axis of the main shaft 111 are aligned with each other.

[Constitution of Seizure Preventing Member]

FIGS. 37A, 37B, 38A, 38B, 39A and 39B are explanatory views relating to the seizure preventing member 90 which is formed on the outer peripheral surface 53*a* of the eccentrically movable bearing 53.

As shown in FIGS. 37A and 37B, a plurality of grooves 91 (six grooves 91 in the drawing) are formed on the outer peripheral surface 53*a* of the eccentrically movable bearing 53, and a metal cylindrical roller 92 is rotatably housed in the respective grooves 91.

Outer peripheral surfaces of the rollers 92 partially project from the outer peripheral surface 53*a* of the eccentrically movable bearing 53 so as to be able to come into contact with the inner peripheral surface of the metal sleeve 40.

As shown in FIGS. 38A and 38B, a cover 93 is connected to a lower end bottom surface 53*b* of the eccentrically movable bearing 53 thus preventing the removal of the rollers 92 from the grooves 91.

In the drawing, symbol 94 indicates a cover mounting hole formed in the lower end bottom surface 53*b* of the eccentrically movable bearing 53, symbol 95 indicates a mounting hole formed in the cover 93, and symbol 99 indicates a fixing bolt inserted into the respective mounting holes 94, 95.

With the above-mentioned constitution, when the main shaft 111 is rotated, the inner peripheral surface of the metal sleeve 40 is brought into contact with an outer peripheral surface of the roller 92 which partially projects from the outer peripheral surface 53*a* of the eccentrically movable bearing 53.

In this case, the roller 92 is configured in a rotatable manner and hence, there is no possibility that strong friction resistance is generated between the inner peripheral surface of the metal sleeve 40 and the outer peripheral surface of the roller 92 so that it is possible to prevent the occurrence of seizure caused by friction.

As shown in FIGS. 39A and 39B, there may be a case where the seizure preventing member 90 is formed by laminating a metal plate 97 having excellent heat resistance and excellent wear resistance and bent along a shape of the outer peripheral surface 53*a* to the outer peripheral surface 53*a* of the eccentrically movable bearing 53 which is brought into contact with the inner peripheral surface of the metal sleeve 40 due to the rotation of the main shaft 111.

Conventionally, there has been proposed an idea of constituting an seizure preventing member which is expensive and complicated by forming the whole outer peripheral surface 53*a* of the eccentrically movable bearing 53 using metal having excellent heat resistance and excellent wear resistance. However, in the embodiment of the present invention, the seizure preventing member is configured to prevent the occurrence of seizure caused by a friction between the inner peripheral surface of the metal sleeve 40 and the outer peripheral surface 53*a* of the eccentrically movable bearing 53 by laminating the special metal plate 97 only to a portion of the outer peripheral surface 53*a* of the eccentrically movable bearing 53.

[Modification of Lifting Mechanism]

Figure 40:
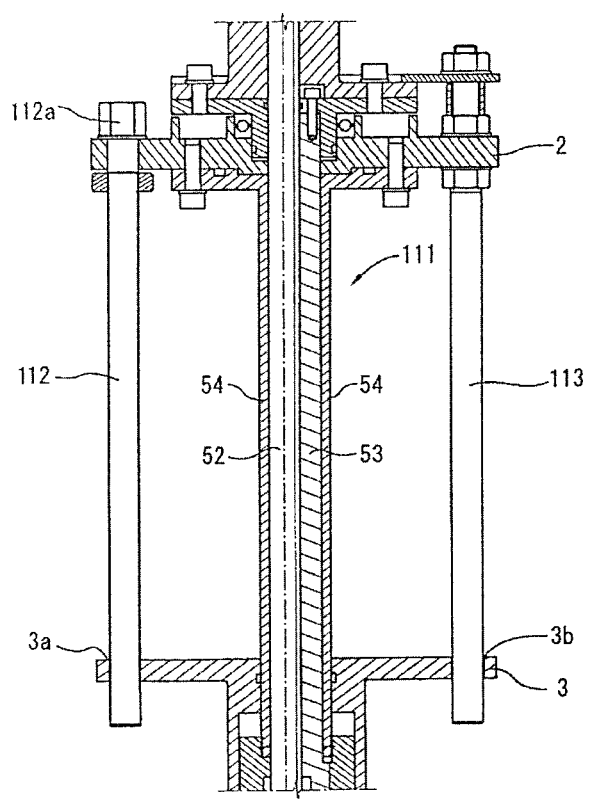
FIG. 40 is a view for explaining a modification of a lifting mechanism.
Figure 42A:
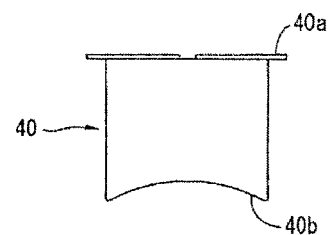
FIG. 42A-FIG. 42D are views showing the constitution of a modification of the metal sleeve.
Figure 42B:
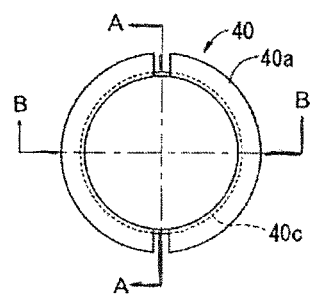
Figure 42C:
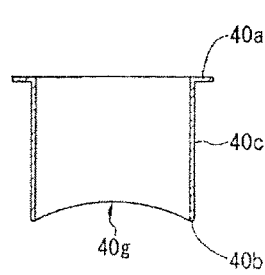
Figure 42D:
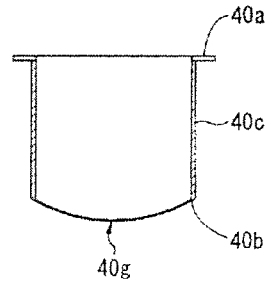

FIG. 40 is a view for explaining a modification of the lifting mechanism.

In the modification explained hereinafter, only a point which makes this modification different from the above-mentioned embodiments is explained, and portions identical to the portions in the above-mentioned embodiments are given the same symbols and description of the identical portions is omitted.

As shown in FIG. 40, the lifting mechanism according to the modification is configured such that one of left and right screws 112 having trapezoidal threads which are mounted on the upper flange 2 in a frame shape is formed into a guide rod 113 and the other screw 112 having trapezoidal threads is threadedly engaged with the lower flange 3 which is fixed to the gate valve, and the upper flange 2 can be elevated or lowered together with the screw 112 having trapezoidal threads by rotating the threadedly engaged screw. Simultaneously with the movement of the upper flange 2, the main shaft 111 mounted on the upper flange 2 is also displaced upwardly or downwardly.

The guide rod 113 is inserted into an Insertion hole 3*b* formed in the lower flange 3 so as to guide the main shaft 111 such that the main shaft 111 moves upward or downward together with the upper flange 2 accurately without wobbling.

Further, the number of the guide rods 113 is not limited to one, and a plurality of guide rods 113 may be provided parallel to the screws 112 having trapezoidal threads. With such a configuration, it is possible to further enhance the accuracy of the upward and downward movement (particularly, the downward movement) of the main shaft 111.

By constituting the snap tap attaching tool 10 as described in the above-mentioned embodiment, the miniaturization and the reduction of weight of the snap tap attaching tool 10 can be realized so that it becomes unnecessary to use a heavy machine in the conveyance of the snap tap attaching tool 10 during operation.

[Modification of Snap Tap Attaching Tool]

FIG. 43 to FIG. 47 show another embodiment of the snap tap attaching tool 10.

That is, as shown in FIG. 41 and FIG. 42, when a lower end opening edge of the rubber packing 23 and a lower end opening edge of the metal sleeve 40 are formed into a wave-like concavo-convex shape along an inner peripheral surface of the water pipe, it is necessary to perform a caulking operation such that these modified opening edges are made to follow the peripheral surface of the water diverting port in the water pipe.

For performing such an operation, it is necessary for the snap tap attaching tool 10 to have the structure capable of giving a certain change to the lifting/lowering operation and the rotating operation of the snap tap attaching tool 10.

That is, in this embodiment, the interlocking mechanism 80 is configured such that the main shaft 111 can be elevated and lowered in the vertical direction in accordance with a wave-like concavo-convex shape of the rubber packing 23 or the metal sleeve 40.

Figure 43A:
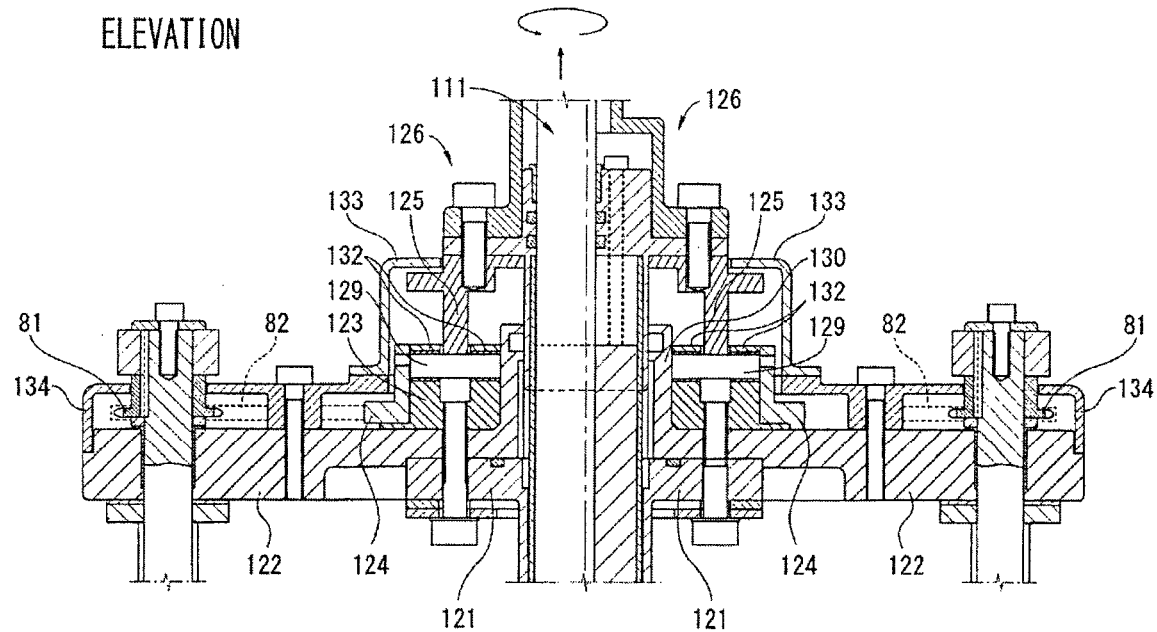
FIGS. 43A and 43B are views showing the constitution of a modification of an interlocking mechanism.
Figure 43B:
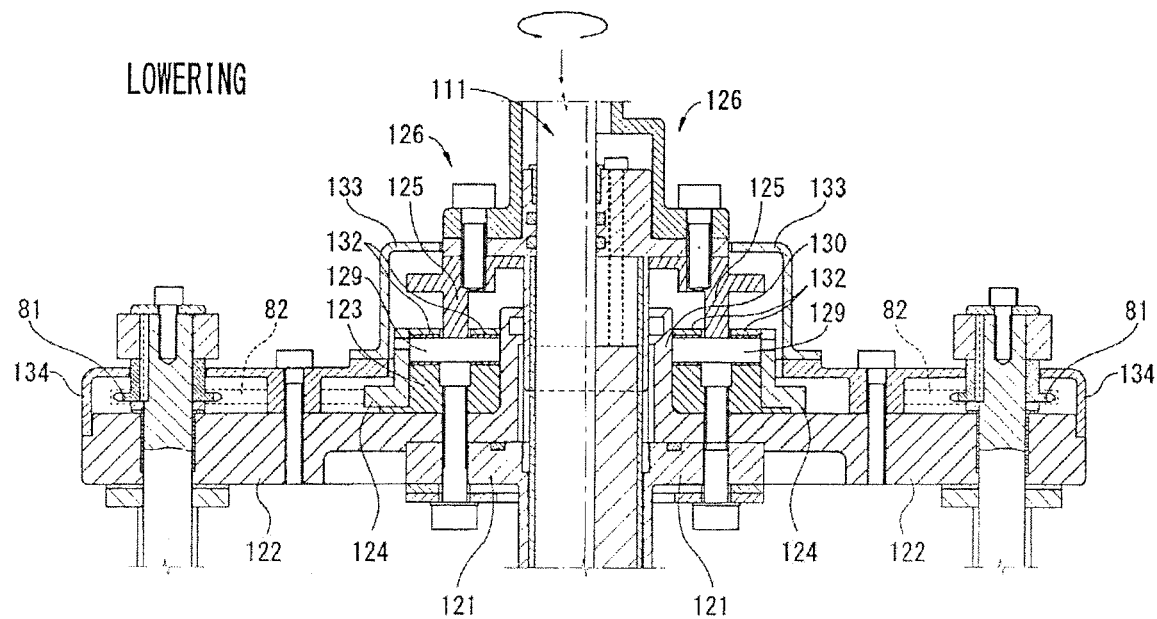

As shown in FIG. 43, the interlocking mechanism 80 is constituted of: a fixed-side member and a movable-side member. The fixed-side member is constituted of a fixed shaft body 121, a chain base 122, a cam base 123, and a tension ring 124. The movable-side member is constituted of a circular cylindrical cam 125, and a connecting member 126 to the main shaft 111.

In FIG. 43, symbol 133 indicates an upper cover, and symbol 134 indicates a lower cover.

The fixed shaft body 121 is formed into a circular cylindrical shape and is integrally and fixedly mounted on a jig body.

Figure 44A:
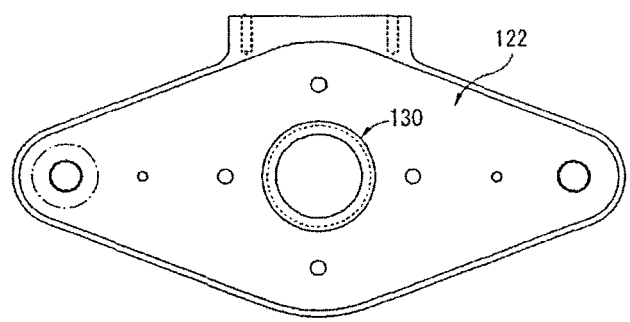
FIGS. 44A and 44B are views showing the constitution of a chain base.
Figure 44B:
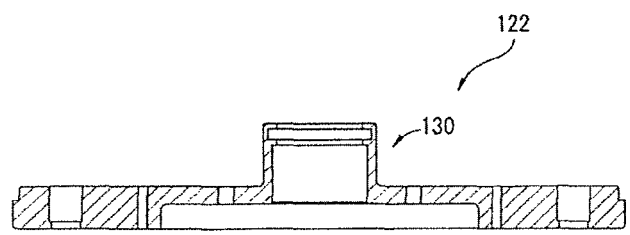

As shown in FIG. 44, the chain base 122 has a rhombic shape as viewed in a plan view, and is fixedly mounted on the fixed shaft body 121, and a cylindrical body 130 is mounted on a center portion of the chain base 122 in an upwardly projecting manner.

A sprocket 81 and a chain 82 are disposed on left and right upper sides of the chain base 122 respectively.

Figure 45A:
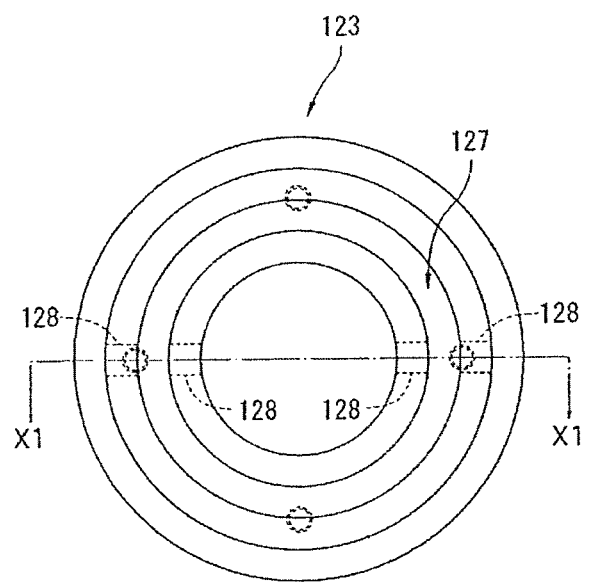
FIGS. 45A and 45B are views showing the constitution of a cam base.
Figure 45B:
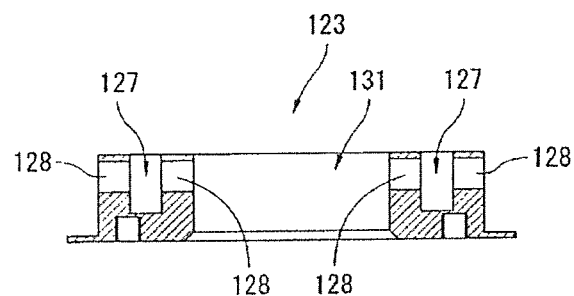

As shown in FIGS. 45A and 45B, the cam base 123 is formed into a cylindrical shape, a circular annular cam groove 127 is formed on an upper surface side of the cylindrical cam base 123 and, at the same time, roller holes 128 are formed in the cam base 123 in a radially penetrating manner.

A roller 129 is rotatably and loosely fitted in the roller hole 128 by way of a bushing 132, and the roller 129 extends between the tension ring 124 and the cylindrical body 130 which is mounted on the center of the chain base 122 in a projecting manner and has both shaft ends thereof supported on the tension ring 124 and the cylindrical body 130 respectively.

As shown in FIG. 43, the tension ring 124 is mounted on the outer periphery of the cam base 123. The roller hole 128 formed in the cam base 123 is covered by the tension ring 124 and hence, the roller 129 is not removed from the roller hole 128.

The circular cylindrical cam 125 is formed such that a cam body 125*a* projects toward a bottom surface side in a cylindrical shape and is formed into a wave-like concavo-convex shape.

Figure 46A:
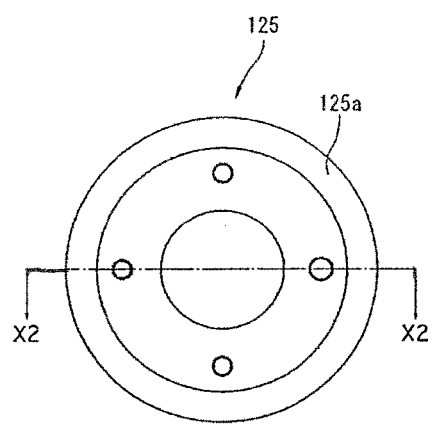
FIGS. 46A, 46B and 46C are views showing the constitution of a cylindrical cam.
Figure 46B:
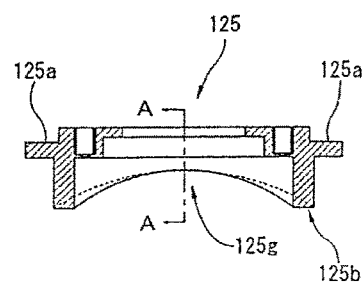
Figure 46C:
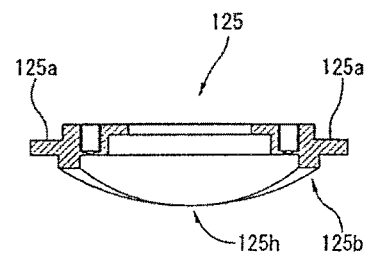

That is, as shown in FIGS. 46A, 46B and 46C, left and right half end surface portions are formed of a half-end-surface-shaped recessed portion 125*g* having a shape which conforms to the inner peripheral surface of the water pipe 11, and upper and lower half end surface portions are respectively formed of a semi-arcuate projecting portion 125*h* having a shape which substantially conforms to the longitudinal direction of the inner peripheral surface of the water pipe 11.

The circular cylindrical cam 125 is slidably fitted in a cam groove 127 formed on the cam base 123, and a lower end edge of the circular cylindrical cam 125 is brought into pressure contact with the roller 129.

Further, the circular cylindrical cam 125 is integrally connected to the main shaft 111 by way of a connecting member 126.

Due to such a configuration, in enlarging a diameter of the metal sleeve 40, by rotating the diameter enlarging handle 118, the main shaft 111 can be elevated and lowered in the vertical direction.

That is, when the diameter enlarging handle 118 is rotated, the main shaft 111 is rotated so that the circular cylindrical cam 125 which is integrally connected with the main shaft 111 is also rotated.

Further, a lower end edge of the circular cylindrical cam 125 which is formed into a wave-like concavo-convex shape is brought into contact with the roller 129 and hence, the circular cylindrical cam 125 is elevated and lowered due to the rotation of the roller 129 so that the main shaft 111 which is integrally connected with the circular cylindrical cam 125 is also elevated and lowered in the vertical direction.

Figure 47:
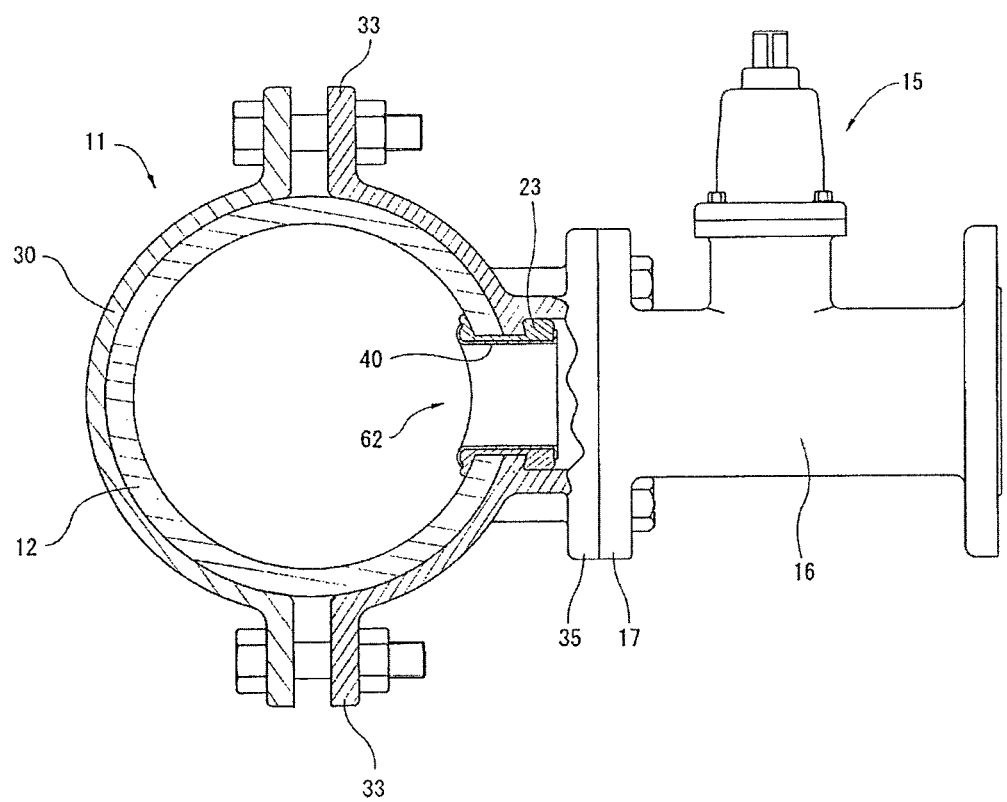
FIG. 47 is a cross-sectional view showing the whole structure of a snap tap according to the modification.

Accordingly, as shown in FIG. 47, on a peripheral edge portion of the water diverting port 62, the rubber packing 23, the metal sleeve 40 and the like which respectively have an end surface thereof formed into a wave-like concavo-convex shape are caulked in a folded back state along the inner peripheral wall surface of the water pipe.

As described above, the rubber packing 23 and the metal sleeve 40 which are caulked to the peripheral edge portion of the water diverting port 62 are formed into a flat shape having no protrusions along the peripheral wall surface of the water pipe. Accordingly, a water passing area in the vicinity of the water diverting port 62 can be increased as much as possible, and the insertion of a pig or a washing machine at the time of cleaning the inside of the pipe can be facilitated. Further, even when the innermost-side regeneration pipe 13 is a pipe made of a soft and unstable material such as a composite pipe and a plastic pipe, the peripheral edge portion of the water diverting port 62 in the water pipe is uniformly enclosed by the rubber packing 23 and the metal sleeve 40 and hence, it is possible to perform branching of water in a stable manner regardless of the water pipe having a duplex pipe structure whereby also the installation work of the snap tap can be easily and accurately performed.

Although the several embodiments of the present invention have been explained in detail with reference to drawings heretofore, these embodiments are merely examples, and the present invention can be carried out in the form of other embodiments to which various modifications and improvements are applied based on the knowledge of those are skilled in the art, not to mention the modes described in the hereinabove.

The invention claimed is:

1. A snap tap forming method of forming a snap tap equipped with a gate valve, comprising
    fixedly attaching the gate valve to a peripheral wall of a water pipe and forming a hole in the peripheral wall of the water pipe with a drill body of a drilling machine which is advanceable and retractable in the inside of a water flow sleeve of the gate valve, wherein
    a partition wall which is formed along a curvature of an outer peripheral wall of the water pipe is hermetically brought into pressure contact with the outer peripheral wall of the water pipe and is mounted on the outer peripheral wall of the water pipe at a position which corresponds to an inflow opening portion of the gate valve and at which a snap tap of the water pipe is formed, and a center drill guide hole which is aligned with an axis of the snap tap is formed in a center portion of the partition wall by drilling, and
    in forming the hole in the water pipe by drilling, a center drill of the drilling machine which is inserted into and accommodated in the inside of the water flow sleeve of the gate valve in an advanceable and retractable manner is inserted into the center drill guide hole, and a water diverting port is formed in the partition wall and the peripheral wall of the water pipe using a core drill by advancing the drilling machine while estimating a drilling center and, thereafter, the drilling machine is removed from the inside of a water flow passage in the gate valve, and the snap tap is communicably connected to the water diverting port by a snap tap attaching tool provided separately.

2. The snap tap forming method according to claim 1, wherein the partition wall is formed so as to close the inflow opening portion of the gate valve.

3. The snap tap forming method according to claim 1, wherein the partition wall is formed on a center portion of a body of a saddle provided for mounting the gate valve on an outer periphery of the water pipe.

4. The snap tap forming method according to claim 2, wherein a saddle for mounting the gate valve is mounted on a snap tap forming portion of the water pipe by way of a band which surrounds an outer periphery of the water pipe, a mounting cylinder which is fitted into the inflow opening portion of the gate valve is mounted on an outer peripheral wall of the saddle in a projecting manner, and a gate valve flange and a saddle flange are integrally connected with each other thus integrally connecting the gate valve and the saddle with each other.

5. The snap tap forming method according to claim 3, wherein a saddle for mounting the gate valve is mounted on a snap tap forming portion of the water pipe by way of a band which surrounds the outer periphery of the water pipe, a mounting cylinder which is joined to the water flow sleeve of the gate valve is mounted on an outer peripheral wall of the saddle in a projecting manner, and a gate valve flange and a saddle flange are integrally connected with each other thus integrally connecting the gate valve and the saddle with each other.

6. A snap tap attaching tool for use in the method of claim 1, comprising a rubber packing configured to be fitted in the water diverting port formed in the water pipe by mounting the rubber packing on a distal end of a main shaft, an opening distal end portion of the metal sleeve fitted on an inner peripheral surface of the rubber packing configured to be insertable and projectable into the inside of the water pipe, an eccentrically movable shaft configured to be inserted into the main shaft in a longitudinal direction, and a diameter enlarging roller mounted on a lower end of the eccentrically movable shaft in an inclined manner by way of a diameter enlarging head, wherein the diameter enlarging roller is of a Japanese hand drum shape and comprises a plurality of stacked roller pieces, and wherein the respective roller pieces are configured to be rotatable independently from each other, the diameter enlarging roller is configured to advance or retract toward the inside or the outside of an outer diameter of the main shaft due to eccentric rotation of the eccentrically movable shaft, and the snap tap is configured to be caulked to the water diverting port of the water pipe by bending the opening distal end portion of the metal sleeve toward the outside in a folded-back state together with the rubber packing due to the rotation of the main shaft while bringing the diameter enlarging roller into contact with the opening distal end portion of the metal sleeve projecting into the inside of the water pipe in a state where the diameter enlarging roller is advanced to the outside of the outer diameter of the main shaft.

\* \* \* \* \*